United States Patent
Zong et al.

(10) Patent No.: US 11,985,589 B2
(45) Date of Patent: May 14, 2024

(54) METHOD, DEVICE, AND SYSTEM FOR NETWORK SWITCHING INVOLVING NETWORK SLICE SELECTION

(71) Applicant: HUAWEI TECHNOLOGIES CO., LTD., Guangdong (CN)

(72) Inventors: Zaifeng Zong, Nanjing (CN); Fenqin Zhu, Shanghai (CN)

(73) Assignee: Huawei Technologies Co., Ltd, Shenzhen (CN)

(*) Notice: Subject to any disclaimer, the term of this patent is extended or adjusted under 35 U.S.C. 154(b) by 272 days.

(21) Appl. No.: 16/951,489

(22) Filed: Nov. 18, 2020

(65) Prior Publication Data
US 2021/0076318 A1    Mar. 11, 2021

Related U.S. Application Data

(63) Continuation of application No. PCT/CN2019/087649, filed on May 20, 2019.

(30) Foreign Application Priority Data

May 21, 2018  (CN) .......................... 201810491230.0

(51) Int. Cl.
*H04W 4/00*   (2018.01)
*H04W 8/12*   (2009.01)
(Continued)

(52) U.S. Cl.
CPC ............. *H04W 48/18* (2013.01); *H04W 8/12* (2013.01); *H04W 36/32* (2013.01); *H04W 80/10* (2013.01)

(58) Field of Classification Search
CPC ....... H04W 48/18; H04W 8/12; H04W 36/32; H04W 80/10; H04W 36/0022;
(Continued)

(56) References Cited

U.S. PATENT DOCUMENTS 10,306,580 B1 *  5/2019  Gupta ................... H04W 8/02
10,660,016 B2 *  5/2020  Qiao .................... H04W 48/04
(Continued)

FOREIGN PATENT DOCUMENTS

CN    106060900 A    10/2016
CN    106210042 A    12/2016
(Continued)

OTHER PUBLICATIONS

Samsung,"TS 23.501: roaming support",SA WG2 Meeting #122bis S2-175772,Aug. 21-25, 2017, Sophia Antipolis, France,Total 2 Pages.
(Continued)

*Primary Examiner* — Amancio Gonzalez
(74) *Attorney, Agent, or Firm* — Leydig, Voit & Mayer, Ltd.

(57) ABSTRACT

A mobility management network element in a visited network performs a method in a home-routed roaming operation to facilitate a switching of a terminal in a session to the visited network. The mobility management network element obtains single network slice selection assistance information (S-NSSAI) for a home network of the terminal corresponding to the session of the terminal. The mobility management network element also obtains S-NSSAI for the visited network corresponding to the session of the terminal, according to a mapping relationship between the S-NSSAI for the home network and the S-NSSAI for the visited network. The mobility management network element then sends the S-NSSAI for the visited network to an access device of the terminal in the visited network, for the access device to process the session.

14 Claims, 17 Drawing Sheets

(51) Int. Cl.
H04W 36/32 (2009.01)
H04W 48/18 (2009.01)
H04W 80/10 (2009.01)

(58) Field of Classification Search
CPC ......... H04W 36/0011; H04W 36/0055; H04W 36/14; H04W 36/385
USPC ........................................................ 370/329
See application file for complete search history.

(56) References Cited

U.S. PATENT DOCUMENTS

| | | | |
|---|---|---|---|
| 10,939,276 B2* | 3/2021 | Zhu | H04W 60/00 |
| 10,980,084 B2* | 4/2021 | Dao | H04W 60/00 |
| 11,026,128 B2* | 6/2021 | Faccin | H04W 8/02 |
| 11,128,985 B2* | 9/2021 | Edge | H04W 4/029 |
| 2018/0124661 A1 | 5/2018 | Tsai | |
| 2020/0259786 A1* | 8/2020 | Saarinen | H04L 63/0414 |
| 2020/0322857 A1* | 10/2020 | Park | H04W 36/12 |
| 2020/0389829 A1* | 12/2020 | Zhu | H04W 36/0011 |
| 2021/0029628 A1* | 1/2021 | Kim | H04W 76/19 |
| 2021/0243587 A1* | 8/2021 | Hoffmann | H04W 76/10 |
| 2021/0289351 A1* | 9/2021 | Ferdi | H04W 12/041 |

FOREIGN PATENT DOCUMENTS

| | | |
|---|---|---|
| CN | 106572517 A | 4/2017 |
| CN | 108024297 A | 5/2018 |
| KR | 20170029584 A | 3/2017 |
| KR | 20170119296 A | 10/2017 |
| WO | 2017190640 A1 | 11/2017 |
| WO | 2018079691 A1 | 5/2018 |

OTHER PUBLICATIONS

Huawei et al.,"OI#2 TS 23.501: Updates Network Slicing and NSSF description",SA WG2 Meeting #123 S2-29178134,Oct. 23-27, 2017, Ljubljana, Slovenia,Total 7 Pages.
Huawei et al.,"S-NSSAI of VPLMN when HO from 4G to 5G",3GPP TSG-SA WG2 Meeting #127bis S2-185094,May 28-Jun. 1, 2018, Newport Beach, USA,Total 11 Pages.
S2-182991 Qualcomm Incorporated,"User plane security policy",3GPP TSG-WG2 Meeting #126,Montreal, Canada, Feb. 26-Mar. 2, 2018,total 29 pages.
S2-172241 Huawei, HiSilicon,"TS23.502 NF services supported by SMF E2E flows",3GPP TSG SA WG2 Meeting #120,Mar. 27-31, 2017, Busan, Korea,total 14 pages.
XP051247628 S2-171891 Samsung, SK Telecom ,""TS 23.501:PLMN-specific NSSAI"",SA WG2 Meeting #120,Mar. 27-31, 2017, Busan, South Korea ,total 5 pages.
XP051449845 S2-184693 C4-183468 CT4 ,"LS on SNSSAI During EPS to 5GS Mobility",SA WG2 Meeting #S2-127BIS,May 28-Jun. 1, 2018. Newport Beach. California. USA,total 7 pages.
XP051535224 3GPP TS 23.502 V15.1.0 (Mar. 2018),3rd Generation Partnership Project;Technical Specification Group Services and System Aspects;Procedures for the 5G System;Stage 2(Release 15),total 284 pages.
3GPP TS 23.401 V15.3.0 (Mar. 2018),3rd Generation Partnership Project;Technical Specification Group Services and System Aspects;General Packet Radio Service (GPRS) enhancements for Evolved Universal Terrestrial Radio Access Network (E-UTRAN) access(Release 15),total 405 pages.
3GPP TS 38.300 V15.1.0 (Mar. 2018),3rd Generation Partnership Project;Technical Specification Group Radio Access Network;NR; NR and NG-RAN Overall Description;Stage 2(Release 15),total 71 pages.
3GPP TS 29.502 V1.1.0 (Apr. 2018),3rd Generation Partnership Project;Technical Specification Group Core Network and Terminals;5G System; Session Management ServicesStage 3(Release 15),total 107 pages.
3GPP TS 29.531 V1.1.0 (Apr. 2018),3rd Generation Partnership Project;Technical Specification Group Core Network and Terminals;5G System;Network Slice Selection ServicesStage 3(Release 15),total 35 pages.
3GPP TS 23.501 V15.1.0 (Mar. 2018),3rd Generation Partnership Project;Technical Specification Group Services and System Aspects-;System Architecture for the 5G System;Stage 2(Release 15),total 201 pages.
Huawei,"Support of Network Slice Discovery",3GPP TSG-RAN WG3 Meeting #93bis R3-162462,Sophia Antipolis, France, Oct. 10-14, 2016,total 4 pages.
3GPP TR 23.799 V1.1. 0 (Oct. 2016),3rd Generation Partnership Project;Technical Specification Group Services and System Aspects;Study on Architecture for Next Generation System(Release 14),total 531 pages.

* cited by examiner

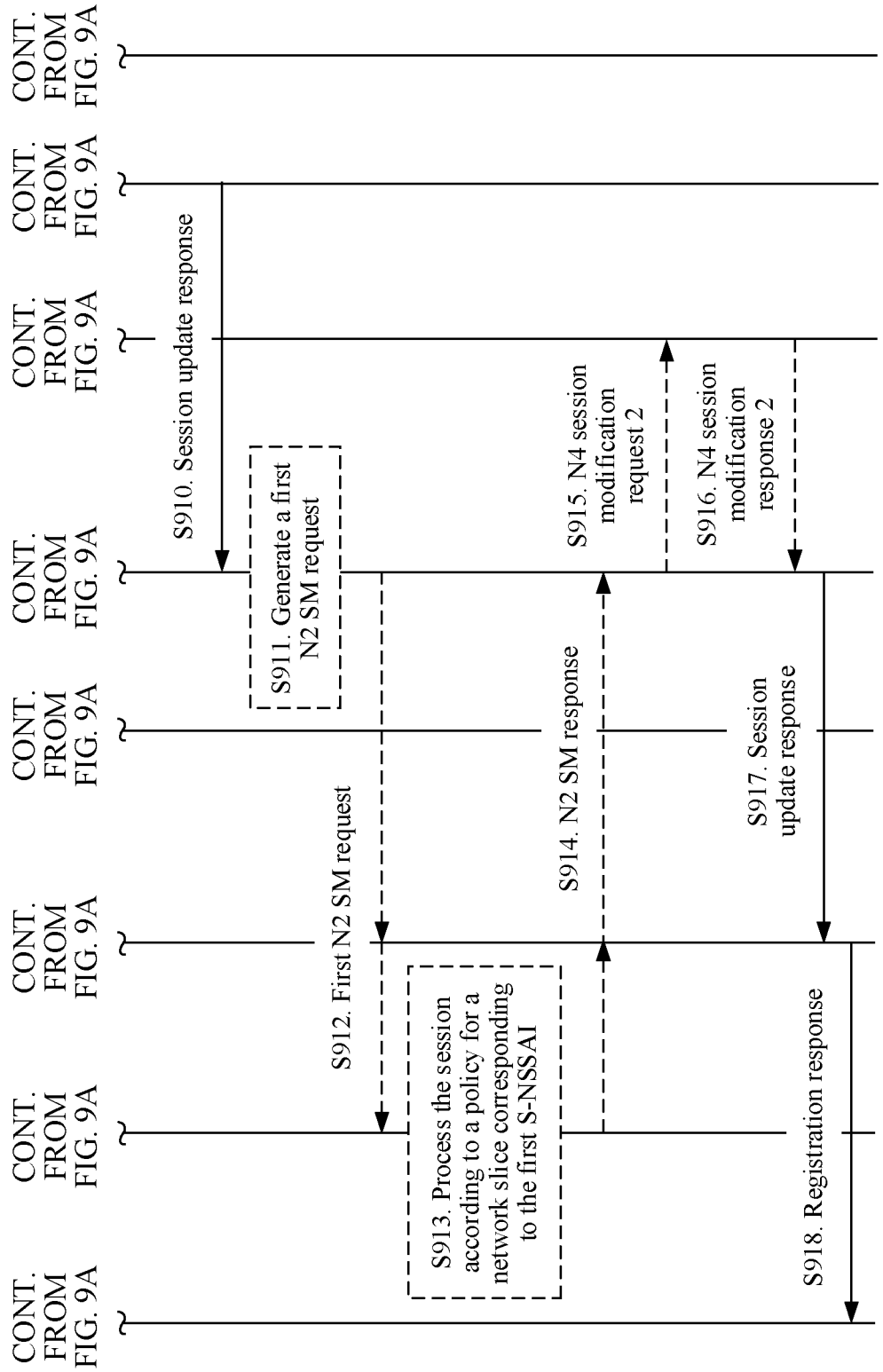

METHOD, DEVICE, AND SYSTEM FOR NETWORK SWITCHING INVOLVING NETWORK SLICE SELECTION

CROSS-REFERENCE TO RELATED APPLICATIONS

This application is a continuation of International Application No. PCT/CN2019/087649, filed on May 20, 2019, which claims priority to Chinese Patent Application No. 201810491230.0, filed on May 21, 2018. The disclosures of the aforementioned applications are hereby incorporated by reference in their entirety.

TECHNICAL FIELD

This application relates to the communications field, and in particular, to a handover method, device, and system.

BACKGROUND

In the prior art, when a terminal is handed over from a 4th generation (4G) network to a 5th generation (5G) network, one or more sessions of the terminal may need to be switched. Currently, when a session of a terminal is to be switched, a session management function (SMF) network element+packet data network (PDN) gateway control plane function (PGW-C) network element that is corresponding to the session determine single network slice selection assistance information (S-NSSAI) corresponding to the session, and sends the S-NSSAI corresponding to the session to a visited SMF (visited-SMF, V-SMF) network element. Then, the V-SMF network element sends the S-NSSAI corresponding to the session to a corresponding access device through an access and mobility management function (AMF) network element.

However, because the SMF network element+PGW-C network element that is corresponding to the session of the terminal is located in a home public land mobile network (HPLMN) of the terminal, in many current scenarios, the S-NSSAI that is corresponding to the session of the terminal and that is determined by the SMF network element+PGW-C network element and sent to the V-SMF network element is S-NSSAI of the HPLMN of the terminal. The following problems may exist in a home routed mode:

First, if the S-NSSAI of the HPLMN of the terminal is not defined in a visited public land mobile network (VPLMN) of the terminal, the V-SMF network element and the corresponding access device cannot identify the S-NSSAI. Consequently, a resource cannot be allocated and session handover for the terminal fails.

Second, if S-NSSAI with a same value as that in the HPLMN of the terminal is defined in the VPLMN of the terminal, but the S-NSSAI of the VPLMN of the terminal and the S-NSSAI of the HPLMN of the terminal have different meanings, the V-SMF network element and the corresponding access device may perform related processing on the session according to an incorrect network slice processing rule. Consequently, the session handover for the terminal may fail. For example, S-NSSAI with a value of x is corresponding to a network slice 1 (which is also mapped as a network slice 1 in the VPLMN) in the HPLMN, and is corresponding to a network slice 2 in the VPLMN. After receiving the S-NSSAI, the access device understands the S-NSSAI as the network slice 2 based on the S-NSSAI in the VPLMN. Consequently, the access device performs related processing on the session according to a processing rule for the network slice 2, and the session handover for the terminal may fail.

Therefore, when the terminal is handed over from the 4G network to the 5G network, how to avoid the session handover failure of the terminal is an urgent problem to be resolved currently.

SUMMARY

Embodiments of this application provide a handover method, device, and system, to avoid a session handover failure of a terminal when the terminal is handed over from a 4G network to a 5G network.

To achieve the foregoing objective, the following technical solutions are used in the embodiments of this application.

According to a first aspect, a handover method is provided. The handover method includes: in a connected-state registration procedure of a terminal, receiving, by a visited session management network element serving the terminal, a session update request from a mobility management network element serving the terminal, where the session update request carries first single network slice selection assistance information S-NSSAI corresponding to a session of the terminal, the first S-NSSAI is obtained by mapping second S-NSSAI corresponding to the session of the terminal, the first S-NSSAI is S-NSSAI of a visited network of the terminal, and the second S-NSSAI is S-NSSAI of a home network of the terminal; and sending, by the visited session management network element, the first S-NSSAI to an access device of the terminal, where the first S-NSSAI is used to update a network slice corresponding to the session. Based on this solution, on one hand, when the terminal is handed over from a 4G network to a 5G network, a problem of a session handover failure caused because the visited session management network element cannot obtain the S-NSSAI that is of the visited network of the terminal and that is corresponding to the session of the terminal, and sends the second S-NSSAI corresponding to the session of the terminal to the access device can be avoided, so that the access device can process the session according to a policy for a network slice corresponding to the first S-NSSAI. On the other hand, because the first S-NSSAI corresponding to the session of the terminal does not need to be obtained from a connected-state handover procedure of the terminal, a delay of the connected-state handover procedure can also be reduced.

It should be noted that the connected-state registration procedure in this embodiment of this application or the following connected-state handover procedure and idle-state registration procedure are all specific to an inter-system scenario. For example, the connected-state registration procedure is a registration procedure after inter-system handover is performed on a terminal in a connected state; and when the registration procedure occurs, the terminal is in the connected state. The connected-state handover procedure is an inter-system handover procedure of the terminal in the connected state. The idle-state registration procedure is an initial registration procedure triggered when a terminal in an idle state moves across systems. The inter-system scenario herein may be, for example, from the 4G network to the 5G network. Descriptions are uniformly provided herein, and details are not described below again.

In a possible design, before the receiving, by a visited session management network element, a session update request from a mobility management network element, the handover method provided in this embodiment of this application may further include: in the connected-state handover procedure of the terminal, sending, by the visited session management network element, a first N2 session management SM request or a second N2 SM request to the access device, where the first N2 SM request carries default S-NSSAI corresponding to the session of the terminal, and is used to indicate to the access device to process the session according to a policy for a network slice corresponding to the default S-NSSAI; the second N2 SM request does not carry S-NSSAI or carries first indication information, and is used to indicate to the access device to process the session according to a default policy; and the default S-NSSAI is the S-NSSAI of the visited network of the terminal. Based on this solution, when the terminal is handed over from the 4G network to the 5G network, if the visited session management network element temporarily does not obtain the first S-NSSAI corresponding to the session of the terminal, because the visited session management network element may send the first N2 SM request or the second N2 SM request to the access device, before obtaining the first S-NSSAI corresponding to the session of the terminal, the access device can process the session by using the policy for the network slice corresponding to the default S-NSSAI, or can process the session by using the default policy. Therefore, the problem of the session handover failure caused because the visited session management network element cannot obtain the S-NSSAI that is of the visited network of the terminal and that is corresponding to the session of the terminal, and sends the second S-NSSAI corresponding to the session of the terminal to the access device can be avoided.

In a possible design, the default S-NSSAI includes default S-NSSAI of the visited network of the terminal or standardized default S-NSSAI.

In a possible design, the handover method provided in this embodiment of this application may further include: receiving, by the visited session management network element, a session update response from an anchor session management network element corresponding to the session, where the session update response carries the first indication information or the second S-NSSAI, or the session update response does not carry S-NSSAI; and generating, by the visited session management network element, the first N2 SM request or the second N2 SM request based on the session update response. Based on this solution, the visited session management network element can generate the first N2 SM request or the second N2 SM request.

In a possible design, the sending, by the visited session management network element, the first S-NSSAI to an access device of the terminal includes: determining, by the visited session management network element, that the first S-NSSAI in the session update request is different from the second S-NSSAI carried in the session update response; or determining, by the visited session management network element, that the session update response does not carry S-NSSAI or the session update response carries the first indication information; and sending, by the visited session management network element, the first S-NSSAI to the access device.

In a possible design, the handover method provided in this embodiment of this application may further include: determining, by the visited session management network element, that the second S-NSSAI is the S-NSSAI of the home network of the terminal. Based on this solution, the visited session management network element can learn that the S-NSSAI of the visited network of the terminal has not been obtained.

In a possible design, the determining, by the visited session management network element, that the second S-NSSAI is the S-NSSAI of the home network of the terminal includes: determining, by the visited session management network element based on information about the anchor session management network element, that the session is in a home routed mode; and determining that the second S-NSSAI is the S-NSSAI of the home network of the terminal. Based on this solution, the visited session management network element can determine that the second S-NSSAI is the S-NSSAI of the home network of the terminal.

In a possible design, the session update response further carries indication information of the home network; and correspondingly, the determining, by the visited session management network element, that the second S-NSSAI is the S-NSSAI of the home network of the terminal includes: determining, by the visited session management network element based on the indication information of the home network, that the second S-NSSAI is the S-NSSAI of the home network of the terminal. Based on this solution, the visited session management network element can determine that the second S-NSSAI is the S-NSSAI of the home network of the terminal.

In a possible design, the handover method provided in this embodiment of this application may further include: receiving, by the visited session management network element, a session establishment request from the mobility management network element, where the session establishment request carries the first indication information or the default S-NSSAI; and generating, by the visited session management network element, the first N2 SM request or the second N2 SM request based on the session establishment request. Based on this solution, the visited session management network element can generate the first N2 SM request or the second N2 SM request.

In a possible design, the sending, by the visited session management network element, the first S-NSSAI to an access device of the terminal includes: determining, by the visited session management network element, that the first S-NSSAI in the session update request is different from the default S-NSSAI in the session establishment request; or determining, by the visited session management network element, that the session establishment request carries the first indication information.

According to a second aspect, a handover method is provided. The method includes: in a connected-state handover procedure of a terminal or an idle-state registration procedure of the terminal, receiving, by a visited session management network element serving a session of the terminal from a mobility management network element serving the terminal, default single network slice selection assistance information S-NSSAI corresponding to the session of the terminal or first indication information, where the default S-NSSAI is S-NSSAI of a visited network of the terminal; and generating, by the visited session management network element, a first N2 session management SM request based on the default S-NSSAI or the first indication information, where the first N2 SM request carries the default S-NSSAI, and is used to indicate to an access device of the terminal to process the session according to a policy for a network slice corresponding to the default S-NSSAI; or generating, by the visited session management network element, a second N2 SM request based on the default S-NSSAI or the first indication information, where the second N2 SM request does not carry S-NSSAI or carries the first indication information, and is used to indicate to an access device of the terminal to process the session according to a default policy; and sending, by the visited session management network element, the first N2 SM request or the second N2 SM request to the access device of the terminal. Based on this solution, when the terminal is handed over from a 4G network to a 5G network, if the visited session management network element temporarily does not obtain first S-NSSAI corresponding to the session of the terminal, because the visited session management network element may send the first N2 SM request or the second N2 SM request to the access device, before obtaining the first S-NSSAI corresponding to the session of the terminal, the access device can process the session by using the policy for the network slice corresponding to the default S-NSSAI, or can process the session by using the default policy. Therefore, a problem of a session handover failure caused because the visited session management network element cannot obtain the S-NSSAI that is of the visited network of the terminal and that is corresponding to the session of the terminal, and sends second S-NSSAI corresponding to the session of the terminal to the access device can be avoided.

In a possible design, the default S-NSSAI includes default S-NSSAI of the visited network of the terminal, or standardized default S-NSSAI, or the S-NSSAI of the visited network that is obtained by the mobility management network element through mapping based on default subscribed S-NSSAI of the terminal.

In a possible design, the handover method provided in this embodiment of this application may further include: receiving, by the visited session management network element from the mobility management network element, the first S-NSSAI corresponding to the session of the terminal, where the first S-NSSAI is obtained by mapping the second S-NSSAI corresponding to the session of the terminal, the first S-NSSAI is the S-NSSAI of the visited network of the terminal, and the second S-NSSAI is S-NSSAI of a home network of the terminal; and sending, by the visited session management network element, the first S-NSSAI to the access device of the terminal, where the first S-NSSAI is used to update a network slice corresponding to the session. Based on this solution, when the terminal is handed over from the 4G network to the 5G network, the problem of the session handover failure caused because the visited session management network element cannot obtain the S-NSSAI that is of the visited network of the terminal and that is corresponding to the session of the terminal, and sends the second S-NSSAI corresponding to the session of the terminal to the access device can be avoided, so that the access device can process the session according to a policy for a network slice corresponding to the first S-NSSAI.

According to a third aspect, a handover method is provided. The handover method includes: receiving, by a visited session management network element serving a terminal from an anchor session management network element corresponding to a session of the terminal, first single network slice selection assistance information S-NSSAI corresponding to the session of the terminal, where the first S-NSSAI is obtained by mapping second S-NSSAI corresponding to the session of the terminal, the first S-NSSAI is S-NSSAI of a visited network of the terminal, and the second S-NSSAI is S-NSSAI of a home network of the terminal; and sending, by the visited session management network element, the first S-NSSAI to an access device of the terminal, where the first S-NSSAI is used to indicate a network slice corresponding to the session. Based on this solution, when the terminal is handed over from a 4G network to a 5G network, a problem of a session handover failure caused because the visited session management network element cannot obtain the S-NSSAI that is of the visited network of the terminal and that is corresponding to the session of the terminal, and sends the second S-NSSAI corresponding to the session of the terminal to the access device can be avoided, so that the access device can process the session according to a policy for a network slice corresponding to the first S-NSSAI.

In a possible design, the receiving, by a visited session management network element from an anchor session management network element corresponding to a session of the terminal, first S-NSSAI corresponding to the session of the terminal includes: receiving, by the visited session management network element, a third message from the anchor session management network element, where the third message carries the first S-NSSAI and the second S-NSSAI; and correspondingly, the handover method provided in this embodiment of this application may further include: sending, by the visited session management network element, a fourth message to a mobility management network element serving the terminal, where the fourth message carries the second S-NSSAI and the first S-NSSAI. Based on this solution, the mobility management network element can obtain the first S-NSSAI corresponding to the session of the terminal.

In a possible design, the receiving, by a visited session management network element from an anchor session management network element corresponding to a session of the terminal, first S-NSSAI corresponding to the session of the terminal includes: receiving, by the visited session management network element, a third N2 SM message from the anchor session management network element corresponding to the session of the terminal, where the third N2 SM message carries the first S-NSSAI corresponding to the session of the terminal. In other words, in this solution, the anchor session management network element may obtain the first S-NSSAI corresponding to the session of the terminal, and further write the first S-NSSAI corresponding to the session of the terminal into the third N2 SM request.

According to a fourth aspect, a handover method is provided. The handover method includes: obtaining, by a visited session management network element serving a terminal, second S-NSSAI corresponding to a session of the terminal and indication information of a home network of the terminal, where the second S-NSSAI is S-NSSAI of the home network of the terminal; determining, by the visited session management network element based on the second S-NSSAI, the indication information of the home network, and a locally configured correspondence between the second S-NSSAI and first S-NSSAI, first S-NSSAI corresponding to the session of the terminal, where the first S-NSSAI is S-NSSAI of a visited network of the terminal; and sending, by the visited session management network element, the first S-NSSAI to an access device of the terminal, where the first S-NSSAI is used to indicate a network slice corresponding to the session. For a technical effect of the fourth aspect, refer to the technical effect of the third aspect. Details are not described herein again.

According to a fifth aspect, a handover method is provided. The handover method includes: obtaining, by a visited session management network element serving a terminal, second S-NSSAI corresponding to a session of the terminal and indication information of a home network of the terminal, where the second S-NSSAI is S-NSSAI of the home network of the terminal; sending, by the visited session management network element, a first message to a slice selection function network element or a mobility management network element serving the terminal, where the first message carries the second S-NSSAI and the indication information of the home network, and is used to request first S-NSSAI corresponding to the session of the terminal, and the first S-NSSAI is S-NSSAI of a visited network of the terminal; receiving, by the visited session management network element from the slice selection function network element or the mobility management network element, the first S-NSSAI corresponding to the session of the terminal; and sending, by the visited session management network element, the first S-NSSAI to an access device of the terminal, where the first S-NSSAI is used to indicate a network slice corresponding to the session. For a technical effect of the fifth aspect, refer to the technical effect of the third aspect. Details are not described herein again.

Based on the fourth aspect or the fifth aspect, in a possible design, the obtaining, by a visited session management network element, second S-NSSAI corresponding to a session of the terminal includes: receiving, by the visited session management network element, the second S-NSSAI from an anchor session management network element; and correspondingly, the handover method provided in this embodiment of this application may further include: sending, by the visited session management network element, a fifth message to the mobility management network element serving the terminal, where the fifth message carries the second S-NSSAI and the first S-NSSAI. Based on this solution, the mobility management network element can obtain the first S-NSSAI corresponding to the session of the terminal.

According to a sixth aspect, a handover method is provided. The handover method includes: obtaining, by a mobility management network element, second single network slice selection assistance information S-NSSAI corresponding to a session of a terminal and indication information of a home network of the terminal, where the second S-NSSAI is S-NSSAI of the home network of the terminal; obtaining, by the mobility management network element based on the second S-NSSAI and the indication information of the home network, first S-NSSAI corresponding to the session of the terminal, where the first S-NSSAI is S-NSSAI of a visited network of the terminal; and sending, by the mobility management network element, the first S-NSSAI to a visited session management network element corresponding to the terminal, where the first S-NSSAI is used to indicate a network slice corresponding to the session. For a technical effect of the sixth aspect, refer to the technical effect of the third aspect. Details are not described herein again.

In a possible design, the obtaining, by the mobility management network element based on the second S-NSSAI and the indication information of the home network, first S-NSSAI corresponding to the session of the terminal includes: determining, by the mobility management network element based on the second S-NSSAI, the indication information of the home network, and a locally configured correspondence between the second S-NSSAI and the first S-NSSAI, the first S-NSSAI corresponding to the session of the terminal. Based on this solution, the mobility management network element can determine the first S-NSSAI corresponding to the session of the terminal.

In a possible design, the obtaining, by the mobility management network element based on the second S-NSSAI and the indication information of the home network, first S-NSSAI corresponding to the session of the terminal includes: sending, by the mobility management network element, a first message to a slice selection function network element, where the first message carries the second S-NSSAI and the indication information of the home network, and is used to request the first S-NSSAI corresponding to the session of the terminal; and receiving, by the mobility management network element from the slice selection function network element, the first S-NSSAI corresponding to the session of the terminal. Based on this solution, the mobility management network element can determine the first S-NSSAI corresponding to the session of the terminal.

In a possible design, the obtaining, by a mobility management network element, second S-NSSAI corresponding to a session of a terminal and indication information of a home network of the terminal includes: receiving, by the mobility management network element, a second message from the visited session management network element, where the second message carries the second S-NSSAI and the indication information of the home network.

In a possible design, the obtaining, by a mobility management network element, second S-NSSAI corresponding to a session of a terminal and indication information of a home network of the terminal includes: receiving, by the mobility management network element, a registration request from the terminal, where the registration request carries the second S-NSSAI, the indication information of the home network, and a session identifier of the session, and the session identifier is used by the mobility management network element to associate the first S-NSSAI with the session.

In a possible design, after the obtaining, by the mobility management network element, first S-NSSAI corresponding to the session of the terminal, the handover method provided in this embodiment of this application may further include: sending, by the mobility management network element, the first S-NSSAI and the second S-NSSAI to the terminal, where the terminal associates the first S-NSSAI with the session of the terminal.

In a possible design, after the obtaining, by the mobility management network element, first S-NSSAI corresponding to the session of the terminal, the handover method provided in this embodiment of this application may further include: sending, by the mobility management network element, the first S-NSSAI and the session identifier of the session to the terminal, where the terminal associates the first S-NSSAI with the session of the terminal.

In a possible design, the handover method provided in this embodiment of this application may further include: sending, by the mobility management network element, a session establishment request to the visited session management network element, where the session establishment request carries first indication information or default S-NSSAI, and the default S-NSSAI is the S-NSSAI of the visited network of the terminal; and the first indication information or the default S-NSSAI is used to indicate to the visited session management network element to generate a first N2 session management SM request, and the first N2 SM request carries the default S-NSSAI corresponding to the session of the terminal, and is used to indicate to an access device of the terminal to process the session according to a policy for a network slice corresponding to the default S-NSSAI; or the first indication information or the default S-NSSAI is used to indicate to the visited session management network element to generate a second N2 SM request, and the second N2 SM request does not carry S-NSSAI or carries the first indication information, and is used to indicate to an access device of the terminal to process the session according to a default policy. For a technical effect of this solution, refer to the technical effect of the second aspect. Details are not described herein again.

According to a seventh aspect, a handover method is provided. The handover method includes: determining, by a mobility management network element, that a session of a terminal is in a home routed mode, and sending, by the mobility management network element, default single network slice selection assistance information S-NSSAI or first indication information to a visited session management network element serving the session, where the default S-NSSAI is S-NSSAI of a visited network of the terminal; and the first indication information or the default S-NSSAI is used to indicate to the visited session management network element to generate a first N2 session management SM request, and the first N2 SM request carries the default S-NSSAI corresponding to the session of the terminal, and is used to indicate to an access device of the terminal to process the session according to a policy for a network slice corresponding to the default S-NSSAI; or the first indication information or the default S-NSSAI is used to indicate to the visited session management network element to generate a second N2 SM request, and the second N2 SM request does not carry S-NSSAI or carries the first indication information, and is used to indicate to an access device of the terminal to process the session according to a default policy. For a technical effect of this solution, refer to the technical effect of the second aspect. Details are not described herein again.

In a possible design, the handover method provided in this embodiment of this application may further include: obtaining, by the mobility management network element, default subscribed S-NSSAI of the terminal, and mapping the default subscribed S-NSSAI as the default S-NSSAI.

According to an eighth aspect, a visited session management network element is provided. The visited session management network element has a function of implementing the method according to any one of the first aspect to the fifth aspect. The function may be implemented by hardware, or may be implemented by hardware by executing corresponding software. The hardware or the software includes one or more modules corresponding to the function.

According to a ninth aspect, a visited session management network element is provided. The visited session management network element includes a processor and a memory, where the memory is configured to store a computer executable instruction; and when the visited session management network element is run, the processor executes the computer executable instruction stored in the memory, so that the visited session management network element performs the handover method according to any one of the first aspect to the fifth aspect.

According to a tenth aspect, a visited session management network element is provided. The visited session management network element includes a processor, where the processor is configured to: after being coupled with a memory and reading an instruction from the memory, perform, according to the instruction, the handover method according to any one of the first aspect to the fifth aspect.

According to an eleventh aspect, a computer-readable storage medium is provided. The computer-readable storage medium stores an instruction; and when the instruction is run on a computer, the computer can be enabled to perform the handover method according to any one of the first aspect to the fifth aspect.

According to a twelfth aspect, a computer program product including an instruction is provided. When the instruction is run on a computer, the computer can be enabled to perform the handover method according to any one of the first aspect to the fifth aspect.

According to a thirteenth aspect, a chip system is provided. The chip system includes a processor, configured to support a visited session management network element in implementing the functions according to the first aspect to the fifth aspect, for example, generating a first N2 SM request or a second N2 SM request based on default S-NSSAI or first indication information. In a possible design, the chip system further includes a memory. The memory is configured to store a program instruction and data that are necessary for the visited session management network element. The chip system may include a chip, or may include a chip and another discrete device.

For a technical effect brought by any one of the design manners of the eighth aspect to the thirteenth aspect, refer to technical effects brought by different design manners of the first aspect to the fifth aspect. Details are not described herein again.

According to a fourteenth aspect, a mobility management network element is provided. The mobility management network element has a function of implementing the method according to any one of the first aspect to the fifth aspect. The function may be implemented by hardware, or may be implemented by hardware by executing corresponding software. The hardware or the software includes one or more modules corresponding to the function.

According to a fifteenth aspect, a mobility management network element is provided. The mobility management network element includes a processor and a memory, where the memory is configured to store a computer executable instruction; and when the mobility management network element is run, the processor executes the computer executable instruction stored in the memory, so that the mobility management network element performs the handover method according to the sixth aspect or the seventh aspect.

According to a sixteenth aspect, a mobility management network element is provided. The mobility management network element includes a processor, where the processor is configured to: after being coupled with a memory and reading an instruction from the memory, perform, according to the instruction, the handover method according to the sixth aspect or the seventh aspect.

According to a seventeenth aspect, a computer-readable storage medium is provided. The computer-readable storage medium stores an instruction; and when the instruction is run on a computer, the computer can be enabled to perform the handover method according to the sixth aspect or the seventh aspect.

According to an eighteenth aspect, a computer program product including an instruction is provided. When the instruction is run on a computer, the computer can be enabled to perform the handover method according to the sixth aspect or the seventh aspect.

According to a nineteenth aspect, a chip system is provided. The chip system includes a processor, configured to support a mobility management network element in implementing the function according to the sixth aspect or the seventh aspect, for example, obtaining second S-NSSAI corresponding to a session of a terminal and indication information of a home network of the terminal. In a possible design, the chip system further includes a memory. The memory is configured to store a program instruction and data that are necessary for the mobility management network element. The chip system may include a chip, or may include a chip and another discrete device.

For a technical effect brought by any one of the design manners of the fourteenth aspect to the nineteenth aspect, refer to technical effects brought by different design manners of the sixth aspect or the seventh aspect. Details are not described again herein.

According to a twentieth aspect, a handover system is provided. The handover system is applied to a connected-state registration procedure of a terminal, and includes a visited session management network element serving the terminal, a mobility management network element serving the terminal, and an access device. The mobility management network element is configured to obtain second S-NSSAI corresponding to a session of the terminal and indication information of a home network of the terminal, where the second S-NSSAI is S-NSSAI of the home network of the terminal. The mobility management network element is further configured to obtain, based on the second S-NSSAI and the indication information of the home network, first S-NSSAI corresponding to the session of the terminal, where the first S-NSSAI is S-NSSAI of a visited network of the terminal. The mobility management network element is further configured to send a session update request to the visited session management network element, where the session update request carries the first S-NSSAI corresponding to the session of the terminal. The visited session management network element is configured to: receive the session update request from the mobility management network element, and send the first S-NSSAI to the access device of the terminal, where the first S-NSSAI is used to update a network slice corresponding to the session of the terminal. For a technical effect of the twentieth aspect, refer to the technical effect of the first aspect. Details are not described herein again.

According to a twenty-first aspect, a handover system is provided. The handover system is applied to an idle-state registration procedure of a terminal, and includes a visited session management network element serving the terminal, a mobility management network element serving the terminal, and an access device. The mobility management network element is configured to obtain second S-NSSAI corresponding to a session of the terminal and indication information of a home network of the terminal, where the second S-NSSAI is S-NSSAI of the home network of the terminal. The mobility management network element is further configured to obtain, based on the second S-NSSAI and the indication information of the home network, first S-NSSAI corresponding to the session of the terminal, where the first S-NSSAI is S-NSSAI of a visited network of the terminal. The mobility management network element is further configured to send a session establishment request to the visited session management network element, where the session establishment request carries the first S-NSSAI corresponding to the session of the terminal. The visited session management network element is configured to: receive the session establishment request from the mobility management network element, and send the first S-NSSAI to the access device of the terminal, where the first S-NSSAI is used to indicate a network slice corresponding to the session of the terminal. For a technical effect of the twenty-first aspect, refer to the technical effect of the third aspect. Details are not described herein again.

According to a twenty-second aspect, a handover system is provided. The handover system is applied to a connected-state handover procedure of a terminal, and includes a visited session management network element serving the terminal, a mobility management network element serving the terminal, and an access device. The visited session management network element is configured to obtain second S-NSSAI corresponding to a session of the terminal and indication information of a home network of the terminal, where the second S-NSSAI is S-NSSAI of the home network of the terminal. The visited session management network element is further configured to send a request message to the mobility management network element, where the request message carries the second S-NSSAI corresponding to the session of the terminal and the indication information of the home network of the terminal, and is used to request first S-NSSAI corresponding to the session of the terminal, and the first S-NSSAI is S-NSSAI of a visited network of the terminal. The mobility management network element is configured to: receive the request message from the visited session management network element, and obtain, based on the second S-NSSAI and the indication information of the home network, the first S-NSSAI corresponding to the session of the terminal. The mobility management network element is further configured to send a response message to the visited session management network element, where the response message carries the first S-NSSAI corresponding to the session of the terminal. The visited session management network element is further configured to: receive the response message from the mobility management network element, and send the first S-NSSAI to the access device of the terminal, where the first S-NSSAI is used to indicate a network slice corresponding to the session of the terminal. For a technical effect of the twenty-second aspect, refer to the technical effect of the third aspect. Details are not described herein again.

According to a twenty-third aspect, a handover system is provided. The handover system is applied to a connected-state handover procedure or an idle-state registration procedure of a terminal, and includes a visited session management network element serving the terminal, a mobility management network element serving the terminal, and an access device. The mobility management network element is configured to: after determining that a session of the terminal is in a home routed mode, send default S-NSSAI or first indication information to the visited session management network element, where the default S-NSSAI is S-NSSAI of a visited network of the terminal. The visited session management network element is configured to: receive the default S-NSSAI or the first indication information from the mobility management network element; and after generating a first N2 SM request based on the default S-NSSAI or the first indication information, send the first N2 SM request to the access device, where the first N2 SM request carries the default S-NSSAI, and is used to indicate to the access device to process the session according to a policy for a network slice corresponding to the default S-NSSAI. Alternatively, the visited session management network element is configured to: receive the default S-NSSAI or the first indication information from the mobility management network element; and after generating a second N2 SM request based on the default S-NSSAI or the first indication information, send the second N2 SM request to the access device, where the second N2 SM request does not carry S-NSSAI or carries the first indication information, and is used to indicate to the access device to process the session according to a default policy. For a technical effect of the twenty-third aspect, refer to the technical effect of the second aspect. Details are not described herein again.

According to a twenty-fourth aspect, a handover system is provided. The handover system may be applied to a connected-state handover procedure or an idle-state registration procedure of a terminal, and includes a visited session management network element serving the terminal and an access device of the terminal. The visited session management network element is configured to obtain second S-NSSAI corresponding to a session of the terminal and indication information of a home network of the terminal, where the second S-NSSAI is S-NSSAI of the home network of the terminal. The visited session management network element is further configured to determine, based on the second S-NSSAI, the indication information of the home network, and a locally configured correspondence between the second S-NSSAI and first S-NSSAI, first S-NSSAI corresponding to the session of the terminal. The visited session management network element is further configured to send the first S-NSSAI to the access device of the terminal, where the first S-NSSAI is used to indicate a network slice corresponding to the session of the terminal. For a technical effect of the twenty-fourth aspect, refer to the technical effect of the third aspect. Details are not described herein again.

According to a twenty-fifth aspect, a handover system is provided. The handover system may be applied to a connected-state handover procedure or an idle-state registration procedure of a terminal, and includes a visited session management network element serving the terminal, a handover selection function network element in a visited network of the terminal, and an access device of the terminal. The visited session management network element is configured to obtain second S-NSSAI corresponding to a session of the terminal and indication information of a home network of the terminal, where the second S-NSSAI is S-NSSAI of the home network of the terminal. The visited session management network element is further configured to send a request message to the handover selection function network element, where the request message carries the second S-NSSAI corresponding to the session of the terminal and the indication information of the home network of the terminal, and is used to request first S-NSSAI corresponding to the session of the terminal, and the first S-NSSAI is S-NSSAI of the visited network of the terminal. The handover selection function network element is configured to: receive the request message from the visited session management network element, and obtain, based on the second S-NSSAI and the indication information of the home network, the first S-NSSAI corresponding to the session of the terminal. The handover selection function network element is further configured to send a response message to the visited session management network element, where the response message carries the first S-NSSAI corresponding to the session of the terminal. The visited session management network element is further configured to: receive the response message from the handover selection function network element, and send the first S-NSSAI to the access device of the terminal, where the first S-NSSAI is used to indicate a network slice corresponding to the session of the terminal. For a technical effect of the twenty-fifth aspect, refer to the technical effect of the third aspect. Details are not described herein again.

According to a twenty-sixth aspect, a handover system is provided. The handover system may be applied to a connected-state handover procedure or an idle-state registration procedure of a terminal, and includes a visited session management network element serving the terminal, an anchor session management network element corresponding to a session of the terminal, and an access device of the terminal. The anchor session management network element is configured to obtain first S-NSSAI corresponding to the session of the terminal, where the first S-NSSAI is S-NSSAI of a visited network of the terminal. The anchor session management network element is further configured to send the first S-NSSAI corresponding to the session of the terminal to the visited session management network element. The visited session management network element is configured to: receive, from the anchor session management network element, the first S-NSSAI corresponding to the session of the terminal, and send the first S-NSSAI to the access device of the terminal, where the first S-NSSAI is used to indicate a network slice corresponding to the session of the terminal. For a technical effect of the twenty-sixth aspect, refer to the technical effect of the third aspect. Details are not described herein again.

These aspects or other aspects of this application are clearer and more comprehensible in descriptions of the following embodiments.

BRIEF DESCRIPTION OF DRAWINGS

FIG. 9A and FIG. 9B are a third schematic flowchart of a handover method according to an embodiment of this application;

DESCRIPTIONS OF EMBODIMENTS

For ease of understanding technical solutions of embodiments of this application, the following first briefly describes technologies related to this application.

Network Slice:

A network slice is a logically isolated network configured to support a specific network capability and network feature, and may include an entire network from end to end (E2E), or a plurality of network functions may be shared by a plurality of network slices. The network slice is a key technology that meets a network differentiation requirement of a 5G mobile communications technology proposed by the 3rd generation partnership project (3GPP). Usually, network features of different network slices are different, and the network slices need to be isolated from each other to prevent mutual interference. For example, a network slice of an augmented reality (AR) service or a virtual reality (VR) service requires high bandwidth and a low delay. A network slice of an internet of things (TOT) service requires support of access from massive terminals, but requires low bandwidth and has no requirement on a delay.

Network Slice Selection Assistance Information (NSSAI):

The NSSAI includes a plurality of pieces of S-NSSAI. The S-NSSAI includes a service type (SST) and a slice differentiator (SD). The SST includes a standardized type and a type customized by an operator. The SD is optional information for distinguishing between a plurality of network slices of a same SST. A type and a function of the NSSAI defined in the 23.501 standard are shown in Table 1.

TABLE 1

| Type | Function description |
| --- | --- |
| Configured NSSAI | NSSAI preconfigured on a terminal |
| S-NSSAI | Used to identify a specific network slice |
| Allowed NSSAI | NSSAI that is allowed to be used by a terminal in a current registration area network provided by a service network |

Figure 1:
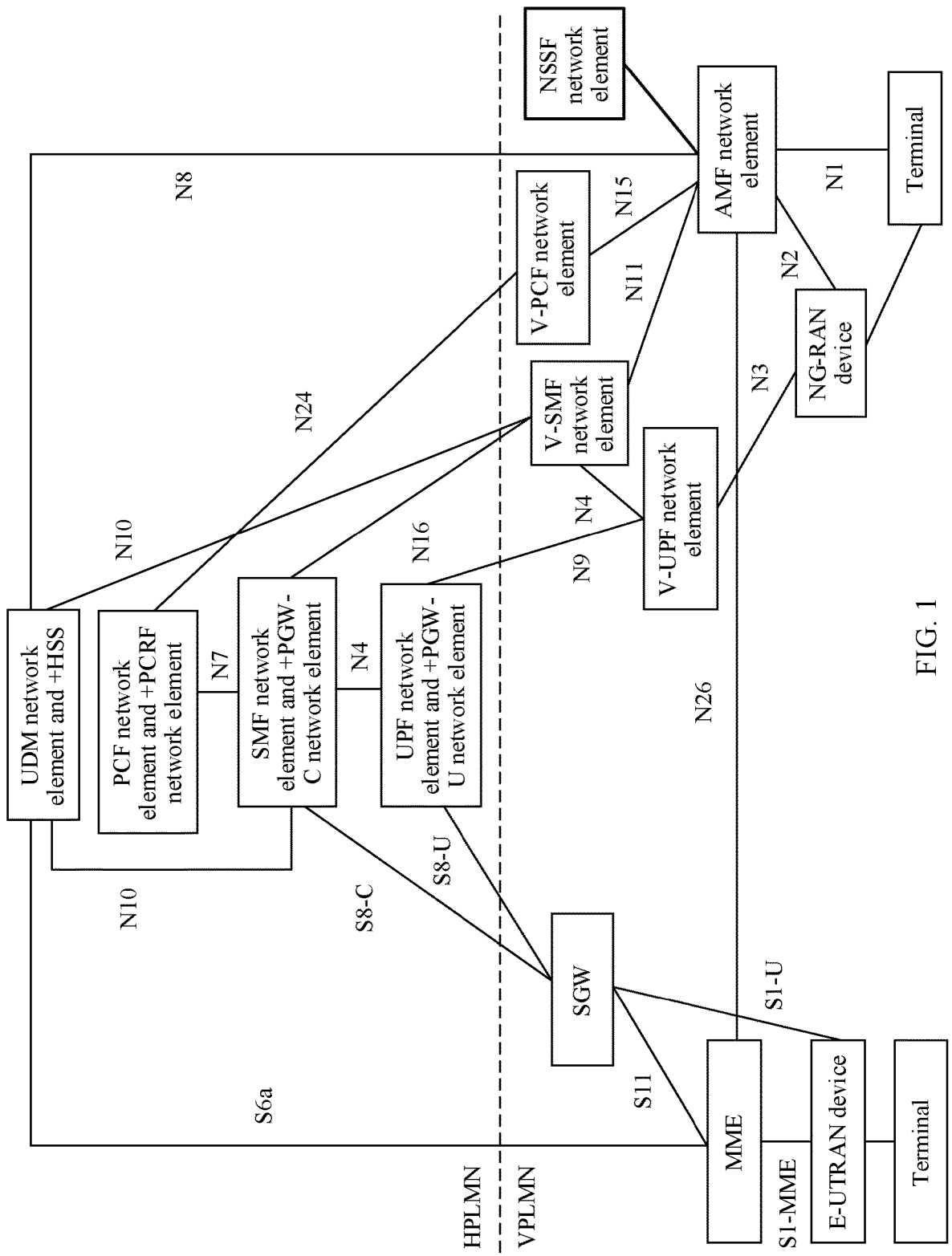
FIG. 1 is a schematic diagram of an architecture of interworking between a 4G network and a 5G network in an existing home routed mode.

Architecture of Interworking Between a 4G Network and a 5G Network:

FIG. 1 is a schematic diagram of an architecture of interworking between a 4G network and a 5G network in an existing home routed (HR) mode. The 4G network and the 5G network share a user plane function (UPF) network element+PDN gateway user plane function (PGW-U) network element, an SMF network element+PGW-C network element, a policy control function (PCF) network element+policy and charging rules function (PCRF) network element, and a home subscriber server (HSS)+unified data management (UDM) network element. Herein, "+" represents an integrated configuration. A UPF is a user plane function of the 5G network, and a PGW-U is a gateway user plane function that is of the 4G network and that is corresponding to the UPF. An SMF is a session management function of the 5G network, and a PGW-C is a gateway control plane function that is of the 4G network and that is corresponding to the SMF. A PCF is a policy control function of the 5G network, and a PCRF is a policy and charging rules function that is of the 4G network and that is corresponding to the PCF. In the embodiments of this application, for ease of description, the UDM network element+HSS is referred to as a user data management network element; the SMF network element+PGW-C network element is referred to as an anchor session management network element; and the UPF network element+PGW-U network element is referred to as an anchor user plane network element. Descriptions are uniformly provided herein, and details are not described below again. Certainly, the foregoing network devices obtained after the integrated configuration may also use other names. This is not specifically limited in the embodiments of this application.

In addition, as shown in FIG. 1, the architecture of interworking between the 4G network and the 5G network may further include a mobility management entity (MME) and a serving gateway (SGW) in the 4G network, and an access and mobility management function (AMF) network element, a V-SMF network element, a visited UPF (visited-UPF, V-UPF) network element, and a visited PCF (visited-UPF, V-PCF) network element in the 5G network. Optionally, the architecture of interworking between the 4G network and the 5G network may further include a network handover selection function (NSSF) network element. When the AMF network element cannot select a network slice for a terminal, the AMF network element may request the NSSF network element to select a network slice for the terminal. This is not specifically limited in the embodiments of this application.

As shown in FIG. 1, in the home routed mode, the UPF network element+HSS, the PCF network element+PCRF network element, the SMF network element+PGW-C network element, and the UPF network element+PGW-U network element are all located in an HPLMN. The MME, the AMF network element, the V-UPF network element, the V-SMF network element, the V-PCF network element, and the like are located in a VPLMN. Descriptions are uniformly provided herein, and details are not described below again.

A terminal accesses the 4G network through an evolved universal terrestrial radio access network (E-UTRAN) device, and the terminal accesses the 5G network through a next generation radio access network (NG-RAN) device. The E-UTRAN device communicates with the MME through an S1-MME interface. The E-UTRAN device communicates with the SGW through an S1-U interface. The MME communicates with the SGW through an S11 interface. The MME communicates with the UDM network element+HSS through an S6a interface. The MME communicates with the AMF network element through an N26 interface. The SGW communicates with the UPF network element+PGW-U network element through an S8-U interface. The SGW communicates with the SMF network element+PGW-C network element through an S8-C interface. The UPF network element+PGW-U communicates with the V-UPF network element through an N9 interface. The V-UPF network element communicates with the NG-RAN device through an N3 interface. The UPF network element+PGW-U network element communicates with the SMF network element+PGW-C network element through an N4 interface. The SMF network element+PGW-C network element communicates with the PCF network element+PCRF network element through an N7 interface. The SMF network element+PGW-C network element communicates with the V-SMF network element through an N16 interface. The V-SMF network element communicates with the AMF network element through an N11 interface. The V-SMF network element communicates with the V-UPF network element through an N4 interface. The PCF network element+PCRF network element communicates with the V-PCF network element through an N24 interface. The V-PCF network element communicates with the AMF network element through an N15 interface. The UDM network element+HSS communicates with the SMF network element+PGW-C network element through an N10 interface. The UDM network element+HSS communicates with the V-SMF network element through an N10 interface. The UDM network element+HSS communicates with the AMF network element through an N8 interface. The AMF network element communicates with the NG-RAN device through an N2 interface. The AMF network element communicates with the terminal through an N1 interface.

It should be noted that the names of the interfaces between the network elements in FIG. 1 are only examples, and the names of the interfaces may be other names in a specific implementation. This is not specifically limited in the embodiments of this application.

It should be noted that the NG-RAN device in the 5G network may also be referred to as an access device. The access device is a device that accesses a core network, and may be, for example, a base station, a broadband network gateway (BNG), an aggregation switch, or a non-3GPP access device. The base station may include various types of base stations, for example, a macro base station, a micro base station (also referred to as a small cell), a relay node, and an access point. This is not specifically limited in the embodiments of this application.

Certainly, there may be other network elements in the 4G network and the 5G network. For example, the 4G network may further include a serving general packet radio system (GPRS) support node (serving GPRS support node, SGSN), and the 5G network may further include an authentication server function (AUSF) network element, an SMF network element, a UPF network element, or the like. For details, refer to an existing 4G or 5G network architecture. This is not specifically limited in the embodiments of this application.

The following describes the technical solutions in the embodiments of this application with reference to the accompanying drawings in the embodiments of this application. In the descriptions of this application, unless otherwise specified, "a plurality of" means two or more than two. "A/B" indicates A or B. In addition, to clearly describe the technical solutions in the embodiments of this application, terms such as "first" and "second" are used in the embodiments of this application to distinguish between same items or similar items that have basically the same functions or purposes. A person skilled in the art may understand that the terms, such as "first" and "second", are not intended to limit a quantity or an execution sequence; and the terms, such as "first" and "second", do not indicate a definite difference.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

Figure 2:
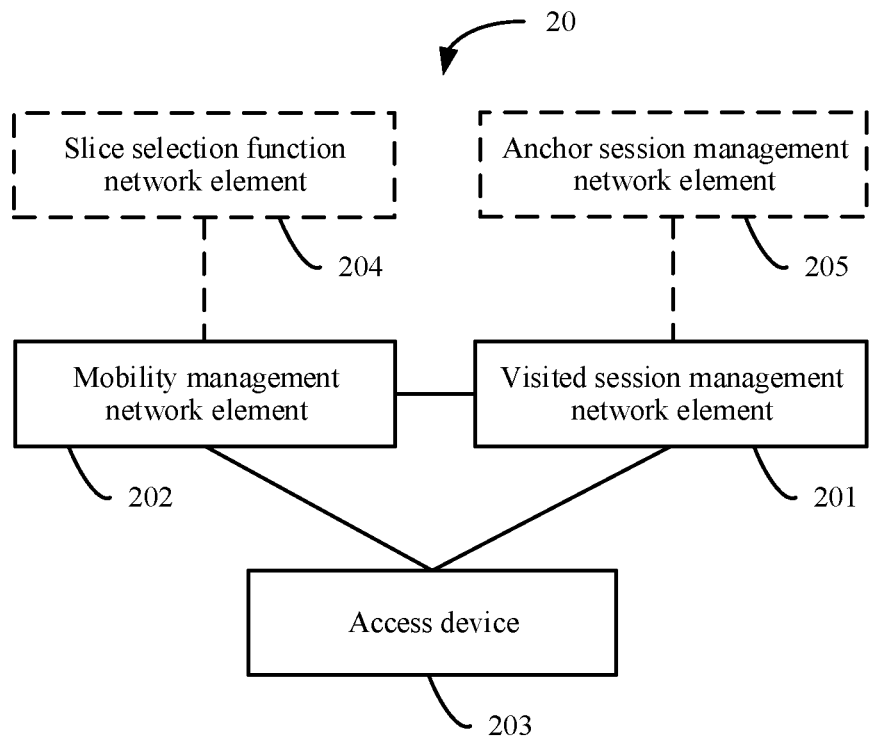
FIG. 2 is a first schematic structural diagram of a handover system according to an embodiment of this application.

FIG. 2 shows a handover system 20 according to an embodiment of this application. The handover system 20 includes a visited session management network element 201 serving a terminal, a mobility management network element 202 serving the terminal, and an access device 203 of the terminal.

Based on the handover system 20 shown in FIG. 2, the following several possible solutions may be provided.

Solution 1:

The handover system 20 is applied to a connected-state registration procedure of the terminal. The mobility management network element 202 is configured to obtain second S-NSSAI corresponding to a session of the terminal and indication information of a home network of the terminal, where the second S-NSSAI is S-NSSAI of the home network of the terminal.

The mobility management network element 202 is further configured to obtain, based on the second S-NSSAI and the indication information of the home network, first S-NSSAI corresponding to the session of the terminal, where the first S-NSSAI is S-NSSAI of a visited network of the terminal.

The mobility management network element 202 is further configured to send a session update request to the visited session management network element 201, where the session update request carries the first S-NSSAI corresponding to the session of the terminal.

The visited session management network element 201 is configured to: receive the session update request from the mobility management network element 202, and send the first S-NSSAI to the access device 203 of the terminal, where the first S-NSSAI is used to update a network slice corresponding to the session of the terminal.

In this solution, in the connected-state registration procedure of the terminal, the mobility management network element can obtain, based on the second S-NSSAI and the indication information of the home network, the first S-NSSAI corresponding to the session of the terminal, and send the first S-NSSAI to the visited session management network element, so that the visited session management network element can obtain the first S-NSSAI corresponding to the session of the terminal, and send the first S-NSSAI to the access device, to update the network slice corresponding to the session of the terminal. Therefore, based on this solution, on one hand, when the terminal is handed over from a 4G network to a 5G network, a problem of a session handover failure caused because the visited session management network element cannot obtain the S-NSSAI that is of the visited network of the terminal and that is corresponding to the session of the terminal, and sends the second S-NSSAI corresponding to the session of the terminal to the access device can be avoided, so that the access device can process the session according to a policy for a network slice corresponding to the first S-NSSAI. On the other hand, because the first S-NSSAI corresponding to the session of the terminal does not need to be obtained from the connected-state handover procedure of the terminal, a delay of the connected-state handover procedure can also be reduced.

Based on the foregoing Solution 1, the visited session management network element 201 is further configured to send a first N2 session management (SM) request or a second SM request to the access device 203.

The first N2 SM request carries default S-NSSAI corresponding to the session, and is used to indicate to the access device to process the session according to a policy for a network slice corresponding to the default S-NSSAI.

The second N2 SM request does not carry S-NSSAI or carries first indication information, and is used to indicate to the access device to process the session according to a default policy.

Optionally, the default S-NSSAI in this embodiment of this application is the S-NSSAI of the visited network of the terminal. For example, default S-NSSAI of the visited network of the terminal or standardized default S-NSSAI may be included. This is not specifically limited in this embodiment of this application. The standardized default S-NSSAI is default S-NSSAI that can be identified by both the visited network of the terminal and the home network of the terminal and that is agreed to be shared by both the visited network and the home network. Descriptions are uniformly provided herein, and details are not described below again.

Optionally, the first indication information in this embodiment of this application may be used to indicate that the S-NSSAI of the visited network of the terminal has not been obtained. For example, the first indication information may be a special value, and the special value is used to indicate that the S-NSSAI of the visited network of the terminal has not been obtained. Alternatively, optionally, the first indication information in this embodiment of this application may include the default S-NSSAI and a special value, and the special value is used to indicate that the S-NSSAI of the visited network of the terminal has not been obtained. This is not specifically limited in this embodiment of this application.

Optionally, the default policy in this embodiment of this application may be the policy for the network slice corresponding to the default S-NSSAI. For related descriptions of the default S-NSSAI, refer to the foregoing part. Details are not described herein again.

In a possible implementation, the mobility management network element 202 is further configured to send a session establishment request to the visited session management network element 201, where the session establishment request carries the first indication information or the second S-NSSAI. The visited session management network element 201 is further configured to: receive the session establishment request from the mobility management network element 202, and generate the first N2 SM request or the second N2 SM request based on the session establishment request.

Alternatively, in another possible implementation, as shown in FIG. 2, the handover system 20 may further include an anchor session management network element 205 corresponding to the session of the terminal. The anchor session management network element 205 is configured to send a session update response to the visited session management network element 201. The session update response carries the first indication information or the second S-NSSAI, or the session update response does not carry S-NSSAI. The visited session management network element 201 is further configured to: receive the session update response from the anchor session management network element 205, and generate the first N2 SM request or the second SM request based on the session update response.

Based on this solution, when the terminal is handed over from the 4G network to the 5G network, if the visited session management network element temporarily does not obtain the first S-NSSAI corresponding to the session of the terminal, because the visited session management network element may send the first N2 SM request or the second N2 SM request to the access device, before obtaining the first S-NSSAI corresponding to the session of the terminal, the access device can process the session by using the policy for the network slice corresponding to the default S-NSSAI, or can process the session by using the default policy. Therefore, the problem of the session handover failure caused because the visited session management network element cannot obtain the S-NSSAI that is of the visited network of the terminal and that is corresponding to the session of the terminal, and sends the second S-NSSAI corresponding to the session of the terminal to the access device can be avoided.

Solution 2

The handover system 20 is applied to an idle-state registration procedure of the terminal. The mobility management network element 202 is configured to obtain second S-NSSAI corresponding to a session of the terminal and indication information of a home network of the terminal, where the second S-NSSAI is S-NSSAI of the home network of the terminal.

The mobility management network element 202 is further configured to obtain, based on the second S-NSSAI and the indication information of the home network, first S-NSSAI corresponding to the session of the terminal, where the first S-NSSAI is S-NSSAI of a visited network of the terminal.

The mobility management network element 202 is further configured to send a session establishment request to the visited session management network element 201, where the session establishment request carries the first S-NSSAI corresponding to the session of the terminal.

The visited session management network element 201 is configured to: receive the session establishment request from the mobility management network element 202, and send the first S-NSSAI to the access device 203 of the terminal, where the first S-NSSAI is used to indicate a network slice corresponding to the session of the terminal.

In this solution, in the idle-state registration procedure of the terminal, the mobility management network element may obtain, based on the second S-NSSAI and the indication information of the home network, the first S-NSSAI corresponding to the session of the terminal, and send the first S-NSSAI to the visited session management network element, so that the visited session management network element can obtain the first S-NSSAI corresponding to the session of the terminal, and send the first S-NSSAI to the access device, to indicate the network slice corresponding to the session of the terminal. Therefore, based on this solution, when the terminal is handed over from a 4G network to a 5G network, a problem of a session handover failure caused because the visited session management network element cannot obtain the S-NSSAI that is of the visited network of the terminal and that is corresponding to the session of the terminal, and sends the second S-NSSAI corresponding to the session of the terminal to the access device can be avoided, so that the access device can process the session according to a policy for a network slice corresponding to the first S-NSSAI.

Based on the foregoing Solution 1 or Solution 2, optionally, in a possible implementation, that the mobility management network element 202 is further configured to obtain, based on the second S-NSSAI and the indication information of the home network, first S-NSSAI corresponding to the session of the terminal includes: determining, based on the second S-NSSAI, the indication information of the home network, and a locally configured correspondence between the second S-NSSAI and the first S-NSSAI, the first S-NSSAI corresponding to the session of the terminal.

Based on the foregoing Solution 1 or Solution 2, optionally, in another possible implementation, as shown in FIG. 2, the handover system 20 may further include a handover selection function network element 204 in the home network of the terminal. That the mobility management network element 202 is further configured to obtain, based on the second S-NSSAI and the indication information of the home network, first S-NSSAI corresponding to the session of the terminal includes: sending a request message to the slice selection function network element 204, where the request message carries the second S-NSSAI corresponding to the session of the terminal and the indication information of the home network of the terminal, and is used to request the first S-NSSAI corresponding to the session of the terminal; and receive, from the slice selection function network element 204, the first S-NSSAI corresponding to the session of the terminal.

Optionally, in a possible implementation, because the mobility management network element 202 is located in the visited network, the slice selection function network element 204 in this embodiment of this application may be a slice selection function network element in the visited network of the terminal. The slice selection function network element in the current visited network stores information about the visited network, or the slice selection function network element in the visited network can perform only S-NSSAI mapping between the visited network and another network. Therefore, the request message in this embodiment of this application may not need to carry indication information of the visited network. Certainly, optionally, the request message in this embodiment of this application may further carry the indication information of the visited network of the terminal. This is not specifically limited in this embodiment of this application.

Optionally, in this embodiment of this application, the indication information of the visited network may be, for example, an identifier of the visited network or other information used to identify the visited network. This is not specifically limited in this embodiment of this application.

Solution 3

The handover system 20 is applied to a connected-state handover procedure of the terminal. The visited session management network element 201 is configured to obtain second S-NSSAI corresponding to a session of the terminal and indication information of a home network of the terminal, where the second S-NSSAI is S-NSSAI of the home network of the terminal.

The visited session management network element 201 is further configured to send a request message to the mobility management network element 202, where the request message carries the second S-NSSAI corresponding to the session of the terminal and the indication information of the home network of the terminal, and is used to request first S-NSSAI corresponding to the session of the terminal, and the first S-NSSAI is S-NSSAI of a visited network of the terminal.

The mobility management network element 202 is configured to: receive the request message from the visited session management network element 201, and obtain, based on the second S-NSSAI and the indication information of the home network, the first S-NSSAI corresponding to the session of the terminal.

The mobility management network element 202 is further configured to send a response message to the visited session management network element 201, where the response message carries the first S-NSSAI corresponding to the session of the terminal.

The visited session management network element 201 is further configured to: receive the response message from the mobility management network element 202, and send the first S-NSSAI to the access device 203 of the terminal, where the first S-NSSAI is used to indicate a network slice corresponding to the session of the terminal.

In this solution, in the connected-state handover procedure of the terminal, the visited session management network element can obtain the first S-NSSAI corresponding to the session of the terminal, and send the first S-NSSAI to the access device, to indicate the network slice corresponding to the session of the terminal. Therefore, based on this solution, when the terminal is handed over from a 4G network to a 5G network, a problem of a session handover failure caused because the visited session management network element cannot obtain the S-NSSAI that is of the visited network of the terminal and that is corresponding to the session of the terminal, and sends the second S-NSSAI corresponding to the session of the terminal to the access device can be avoided, so that the access device can process the session according to a policy for a network slice corresponding to the first S-NSSAI.

Solution 4:

The handover system 20 may be applied to a connected-state handover procedure or an idle-state registration procedure of the terminal. The mobility management network element 202 is configured to: after determining that a session of the terminal is in a home routed mode, send default S-NSSAI or first indication information to the visited session management network element 201.

The visited session management network element 201 is configured to: receive the default S-NSSAI or the first indication information from the mobility management network element 202; and after generating a first N2 SM request based on the default S-NSSAI or the first indication information, send the first N2 SM request to the access device 203, where the first N2 SM request carries default S-NSSAI corresponding to the session, and is used to indicate to the access device to process the session according to a policy for a network slice corresponding to the default S-NSSAI.

Alternatively, the visited session management network element 201 is configured to: receive the default S-NSSAI or the first indication information from the mobility management network element 202; and after generating a second N2 SM request based on the default S-NSSAI or the first indication information, send the second N2 SM request to the access device 203 of the terminal, where the second N2 SM request does not carry S-NSSAI or carries the first indication information, and is used to indicate to the access device to process the session according to a default policy.

For related descriptions of the default S-NSSAI and the first indication information, refer to the descriptions in Solution 1. Details are not described herein again.

In addition, the default S-NSSAI in this embodiment of this application may alternatively be S-NSSAI of a visited network that is obtained by the mobility management network element 202 through mapping based on default subscribed S-NSSAI of the terminal. This is not specifically limited in this embodiment of this application.

Based on this solution, when the terminal is handed over from a 4G network to a 5G network, the visited session management network element may generate the first N2 SM request based on the default S-NSSAI or the first indication information that is sent by the mobility management network element and send the first N2 SM request to the access device, so that the access device can process the session by using the policy for the network slice corresponding to the default S-NSSAI; or the visited session management network element may generate the second N2 SM request based on the default S-NSSAI or the first indication information that is sent by the mobility management network element and send the second N2 SM request to the access device, so that the access device can process the session according to the default policy. Therefore, a problem of a session handover failure caused because the visited session management network element cannot obtain the S-NSSAI that is of the visited network of the terminal and that is corresponding to the session of the terminal, and sends second S-NSSAI corresponding to the session of the terminal to the access device can be avoided.

Optionally, the visited session management network element 201, the mobility management network element 202, and the access device 203 in the handover system 20 shown in FIG. 2 may directly communicate with each other, or may communicate with each other through forwarding by another device. This is not specifically limited in this embodiment of this application.

Optionally, the visited session management network element 201 and the slice selection function network element 204 in the handover system 20 shown in FIG. 2 may directly communicate with each other, or may communicate with each other through forwarding by another device. This is not specifically limited in this embodiment of this application.

Figure 3:
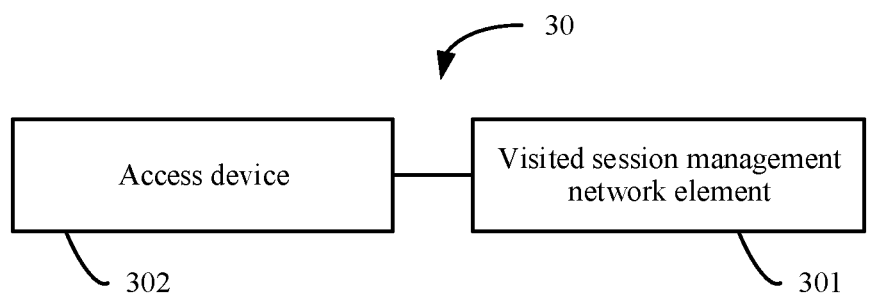
FIG. 3 is a second schematic structural diagram of a handover system according to an embodiment of this application.

FIG. 3 shows a handover system 30 according to an embodiment of this application. The handover system 30 may be applied to a connected-state handover procedure or an idle-state registration procedure of a terminal, and includes a visited session management network element 301 serving the terminal and an access device 302 of the terminal.

The visited session management network element 301 is configured to obtain second S-NSSAI corresponding to a session of the terminal and indication information of a home network of the terminal, where the second S-NSSAI is S-NSSAI of the home network of the terminal.

The visited session management network element 301 is further configured to determine, based on the second S-NSSAI, the indication information of the home network, and a locally configured correspondence between the second S-NSSAI and first S-NSSAI, first S-NSSAI corresponding to the session of the terminal.

The visited session management network element 301 is further configured to send the first S-NSSAI to the access device 302 of the terminal, where the first S-NSSAI is used to indicate a network slice corresponding to the session of the terminal.

Optionally, the visited session management network element 301 and the access device 302 in the handover system 30 shown in FIG. 3 may directly communicate with each other, or may communicate with each other through forwarding by another device. This is not specifically limited in this embodiment of this application.

In this solution, in the connected-state handover procedure or the idle-state registration procedure of the terminal, the visited session management network element can determine, based on the second S-NSSAI, the indication information of the home network, and the locally configured correspondence between the second S-NSSAI and the first S-NSSAI, the first S-NSSAI corresponding to the session of the terminal, and send the first S-NSSAI to the access device, to indicate the network slice corresponding to the session of the terminal. Therefore, based on this solution, when the terminal is handed over from a 4G network to a 5G network, a problem of a session handover failure caused because the visited session management network element cannot obtain the S-NSSAI that is of the visited network of the terminal and that is corresponding to the session of the terminal, and sends the second S-NSSAI corresponding to the session of the terminal to the access device can be avoided, so that the access device can process the session according to a policy for a network slice corresponding to the first S-NSSAI.

Figure 4:
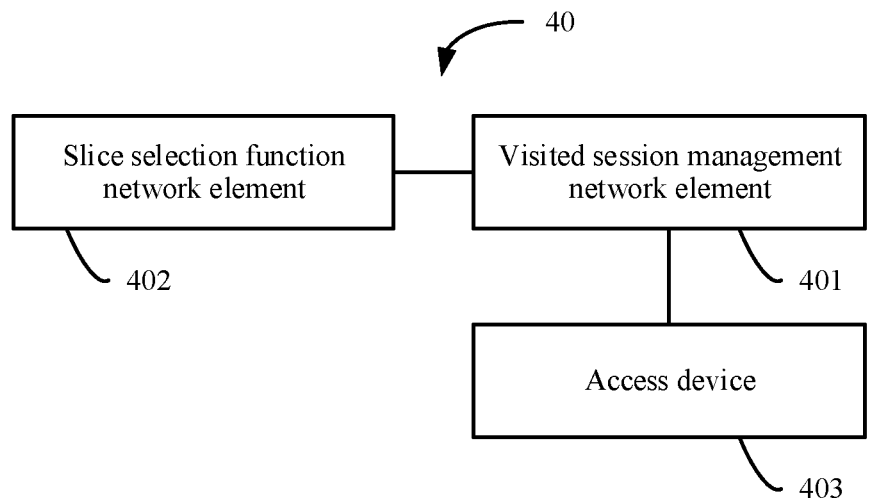
FIG. 4 is a third schematic structural diagram of a handover system according to an embodiment of this application.

FIG. 4 shows a handover system 40 according to an embodiment of this application. The handover system 40 may be applied to a connected-state handover procedure or an idle-state registration procedure of a terminal, and includes a visited session management network element 401 serving the terminal, a handover selection function network element 402 in a visited network of the terminal, and an access device 403 of the terminal.

The visited session management network element 401 is configured to obtain second S-NSSAI corresponding to a session of the terminal and indication information of a home network of the terminal, where the second S-NSSAI is S-NSSAI of the home network of the terminal.

The visited session management network element 401 is further configured to send a request message to the handover selection function network element 402, where the request message carries the second S-NSSAI corresponding to the session of the terminal and the indication information of the home network of the terminal, and is used to request first S-NSSAI corresponding to the session of the terminal, and the first S-NSSAI is S-NSSAI of the visited network of the terminal.

The handover selection function network element 402 is configured to: receive the request message from the visited session management network element 401, and obtain, based on the second S-NSSAI and the indication information of the home network, the first S-NSSAI corresponding to the session of the terminal.

The handover selection function network element 402 is further configured to send a response message to the visited session management network element 401, where the response message carries the first S-NSSAI corresponding to the session of the terminal.

The visited session management network element 401 is further configured to: receive the response message from the handover selection function network element 402, and send the first S-NSSAI to the access device 403 of the terminal, where the first S-NSSAI is used to indicate a network slice corresponding to the session of the terminal.

Optionally, in a possible implementation, because the visited session management network element 401 is located in the visited network, the slice selection function network element 402 in this embodiment of this application may be a slice selection function network element in the visited network of the terminal. The slice selection function network element in the current visited network stores information about the visited network, or the slice selection function network element in the visited network can perform only S-NSSAI mapping between the visited network and another network. Therefore, the request message in this embodiment of this application may not need to carry indication information of the visited network. Certainly, optionally, the request message in this embodiment of this application may further carry the indication information of the visited network of the terminal. This is not specifically limited in this embodiment of this application.

Optionally, in this embodiment of this application, the indication information of the visited network may be, for example, an identifier of the visited network or other information used to identify the visited network. This is not specifically limited in this embodiment of this application.

Optionally, the visited session management network element 401 and the access device 403 in the handover system 40 shown in FIG. 4 may directly communicate with each other, or may communicate with each other through forwarding by another device. This is not specifically limited in this embodiment of this application.

Optionally, the visited session management network element 401 and the handover selection function network element 402 in the handover system 40 shown in FIG. 4 may directly communicate with each other, or may communicate with each other through forwarding by another device. This is not specifically limited in this embodiment of this application.

In this solution, in the connected-state handover procedure or the idle-state registration procedure of the terminal, the visited session management network element can obtain, from the handover selection function network element in the visited network of the terminal, the first S-NSSAI corresponding to the session of the terminal, and send the first S-NSSAI to the access device, to indicate the network slice corresponding to the session of the terminal. Therefore, based on this solution, when the terminal is handed over from a 4G network to a 5G network, a problem of a session handover failure caused because the visited session management network element cannot obtain the S-NSSAI that is of the visited network of the terminal and that is corresponding to the session of the terminal, and sends the second S-NSSAI corresponding to the session of the terminal to the access device can be avoided, so that the access device can process the session according to a policy for a network slice corresponding to the first S-NSSAI.

Figure 5:
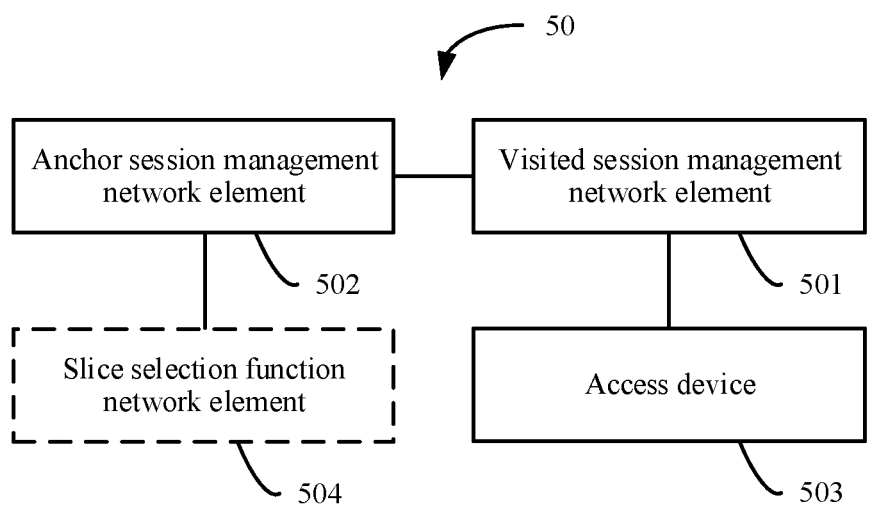
FIG. 5 is a fourth schematic structural diagram of a handover system according to an embodiment of this application.

FIG. 5 shows a handover system 50 according to an embodiment of this application. The handover system 50 may be applied to a connected-state handover procedure or an idle-state registration procedure of a terminal, and includes a visited session management network element 501 serving the terminal, an anchor session management network element 502 corresponding to a session of the terminal, and an access device 503 of the terminal.

The anchor session management network element 502 is configured to obtain first S-NSSAI corresponding to the session of the terminal, where the first S-NSSAI is S-NSSAI of a visited network of the terminal.

The anchor session management network element 502 is further configured to send the first S-NSSAI corresponding to the session of the terminal to the visited session management network element 501.

The visited session management network element 501 is configured to: receive, from the anchor session management network element 502, the first S-NSSAI corresponding to the session of the terminal, and send the first S-NSSAI to the access device 503 of the terminal, where the first S-NSSAI is used to indicate a network slice corresponding to the session of the terminal.

Optionally, in a possible implementation, that the anchor session management network element 502 is configured to obtain first S-NSSAI corresponding to the session of the terminal includes: obtaining second S-NSSAI corresponding to the session of the terminal and indication information of the visited network of the terminal; and determining, based on the second S-NSSAI, the indication information of the visited network of the terminal, and a locally configured correspondence between the second S-NSSAI and the first S-NSSAI, the first S-NSSAI corresponding to the session of the terminal. The second S-NSSAI is S-NSSAI of a home network of the terminal.

Optionally, in another possible implementation, as shown in FIG. 5, the handover system 50 may further include a slice selection function network element 504 in the home network of the terminal. That the anchor session management network element 502 is configured to obtain first S-NSSAI corresponding to the session of the terminal includes: obtaining second S-NSSAI corresponding to the session of the terminal and indication information of the visited network of the terminal; sending a request message to the slice selection function network element 504, where the request message carries the second S-NSSAI corresponding to the session of the terminal and the indication information of the visited network of the terminal, and is used to request the first S-NSSAI corresponding to the session of the terminal; and receiving, from the slice selection function network element 504, the first S-NSSAI corresponding to the session of the terminal.

Optionally, the request message in this embodiment of this application may further carry indication information of the home network of the terminal, and the indication information of the home network of the terminal is used to indicate that the second S-NSSAI is S-NSSAI of the home network of the terminal. This is not specifically limited in this embodiment of this application.

Optionally, the visited session management network element 501 and the access device 503 in the handover system 50 shown in FIG. 5 may directly communicate with each other, or may communicate with each other through forwarding by another device. This is not specifically limited in this embodiment of this application.

Optionally, the visited session management network element 501 and the anchor session management network element 502 in the handover system 50 shown in FIG. 5 may directly communicate with each other, or may communicate with each other through forwarding by another device. This is not specifically limited in this embodiment of this application.

Optionally, the anchor session management network element 502 and the slice selection function network element 504 in the handover system 50 shown in FIG. 5 may directly communicate with each other, or may communicate with each other through forwarding by another device. This is not specifically limited in this embodiment of this application.

In this solution, in the connected-state handover procedure or the idle-state registration procedure of the terminal, the visited session management network element receives, from the anchor session management network element corresponding to the session of the terminal, the first S-NSSAI corresponding to the session of the terminal, and sends the first S-NSSAI to the access device, to indicate the network slice corresponding to the session of the terminal. Therefore, based on this solution, when the terminal is handed over from a 4G network to a 5G network, a problem of a session handover failure caused because the visited session management network element cannot obtain the S-NSSAI that is of the visited network of the terminal and that is corresponding to the session of the terminal, and sends the second S-NSSAI corresponding to the session of the terminal to the access device can be avoided, so that the access device can process the session according to a policy for a network slice corresponding to the first S-NSSAI.

Optionally, the handover systems shown in FIG. 2 to FIG. 5 may be applied to the architecture of interworking between the 4G network and the 5G network shown in FIG. 1. In this case, a network element or an entity corresponding to the visited session management network element may be the V-SMF network element in the 5G network. A network element or an entity corresponding to the mobility management network element may be the AMF network element in the 5G network. A network element or an entity corresponding to the slice selection function network element may be the NS SF network element in the 5G network. A network element or an entity corresponding to the anchor session management network element may be the SMF network element+PGW-C network element in the architecture of interworking between the 4G network and the 5G network. This is not specifically limited in this embodiment of this application.

Optionally, the visited session management network elements in FIG. 2 to FIG. 5, or the mobility management network element in FIG. 2, or the slice selection function network element in FIG. 2 or FIG. 4, or the anchor session management network element in FIG. 2 or FIG. 5 may be implemented by one device, or may be implemented by a plurality of devices together, or may be a functional module in a device. This is not specifically limited in this embodiment of this application. It may be understood that the foregoing functions may be network elements in a hardware device, or may be software functions running on dedicated hardware, or may be instantiated virtualization functions on a platform (for example, a cloud platform).

Figure 6:
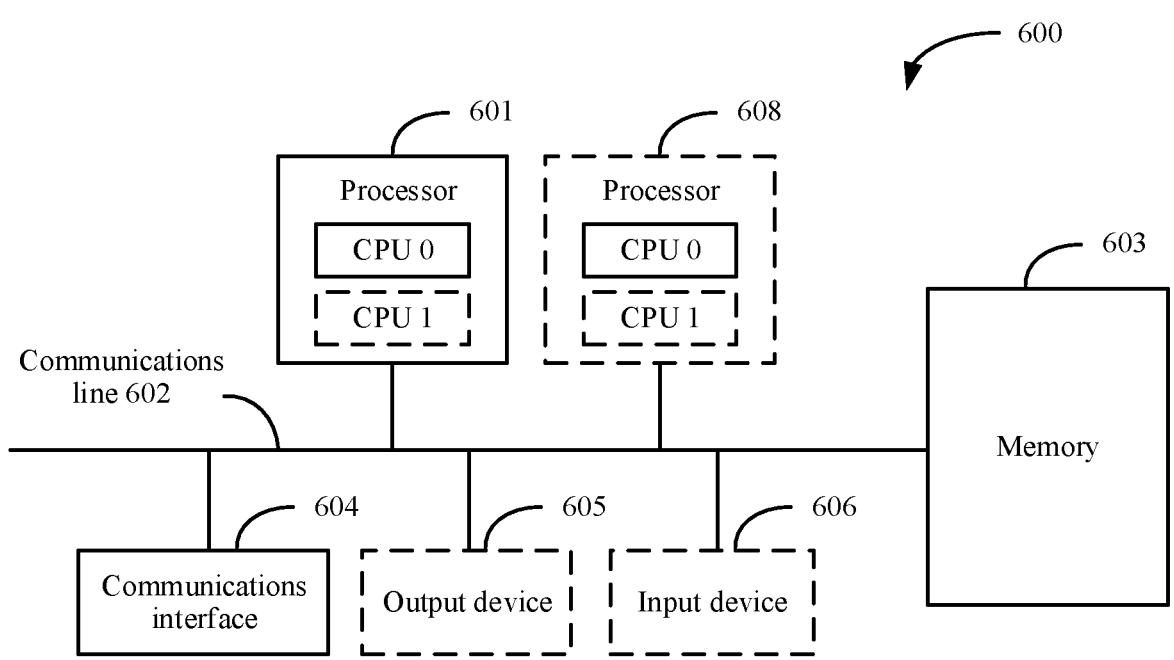
FIG. 6 is a schematic diagram of a hardware structure of a communications device according to an embodiment of this application.

For example, the visited session management network elements in FIG. 2 to FIG. 5, or the mobility management network element in FIG. 2, or the slice selection function network element in FIG. 2 or FIG. 4, or the anchor session management network element in FIG. 2 or FIG. 5 may be implemented by a communications device in FIG. 6. FIG. 6 is a schematic diagram of a hardware structure of a communications device according to an embodiment of this application. A communications device 600 includes at least one processor 601, a communications line 602, a memory 603, and at least one communications interface 604.

The processor 601 may be a general-purpose central processing unit (CPU), a microprocessor, an application-specific integrated circuit (ASIC), or one or more integrated circuits configured to control program execution of the solutions in this application.

The communications line 602 may include a path for transmitting information between the foregoing components.

The communications interface 604 is any apparatus like a transceiver, to communicate with another device or a communications network such as the Ethernet, a radio access network (RAN), or a wireless local area network (WLAN).

The memory 603 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 603 is not limited thereto. The memory may exist independently and is connected to the processor through the communications line 602. The memory may be alternatively integrated with the processor.

The memory 603 is configured to store a computer executable instruction for performing the solutions in this application, and execution of the computer executable instruction is controlled by the processor 601. The processor 601 is configured to execute the computer executable instruction stored in the memory 603, to implement a handover method provided in the following embodiments of this application.

Optionally, the computer executable instruction in this embodiment of this application may also be referred to as application program code. This is not specifically limited in this embodiment of this application.

In a specific implementation, in an embodiment, the processor 601 may include one or more CPUs, for example, a CPU 0 and a CPU 1 in FIG. 6.

In a specific implementation, in an embodiment, the communications device 600 may include a plurality of processors, for example, a processor 601 and a processor 608 in FIG. 6. Each of these processors may be a single-core (single-CPU) processor, or may be a multi-core (multi-CPU) processor. The processor herein may be one or more devices, circuits, and/or processing cores configured to process data (for example, a computer program instruction).

In a specific implementation, in an embodiment, the communications device 600 may further include an output device 605 and an input device 606. The output device 605 communicates with the processor 601, and may display information in a plurality of manners. For example, the output device 605 may be a liquid crystal display (LCD), a light-emitting diode (LED) display device, a cathode ray tube (CRT) display device, or a projector. The input device 606 communicates with the processor 601, and may receive an input of a user in a plurality of manners. For example, the input device 606 may be a mouse, a keyboard, a touchscreen device, or a sensor device.

The communications device 600 may be a general-purpose device or a dedicated device. In a specific implementation, the communications device 600 may be a desktop computer, a portable computer, a network server, a palmtop computer (personal digital assistant, PDA), a mobile phone, a tablet computer, a wireless terminal device, an embedded device, or a device having a structure similar to that in FIG. 6. A type of the communications device 600 is not limited in this embodiment of this application.

The following describes in detail a handover method provided in embodiments of this application with reference to FIG. 1 to FIG. 6.

It should be noted that names of messages between network elements in the following embodiments of this application, names of parameters in messages, or the like are merely examples, and there may be other names in a specific implementation. This is not specifically limited in this embodiment of this application.

Figure 7A:
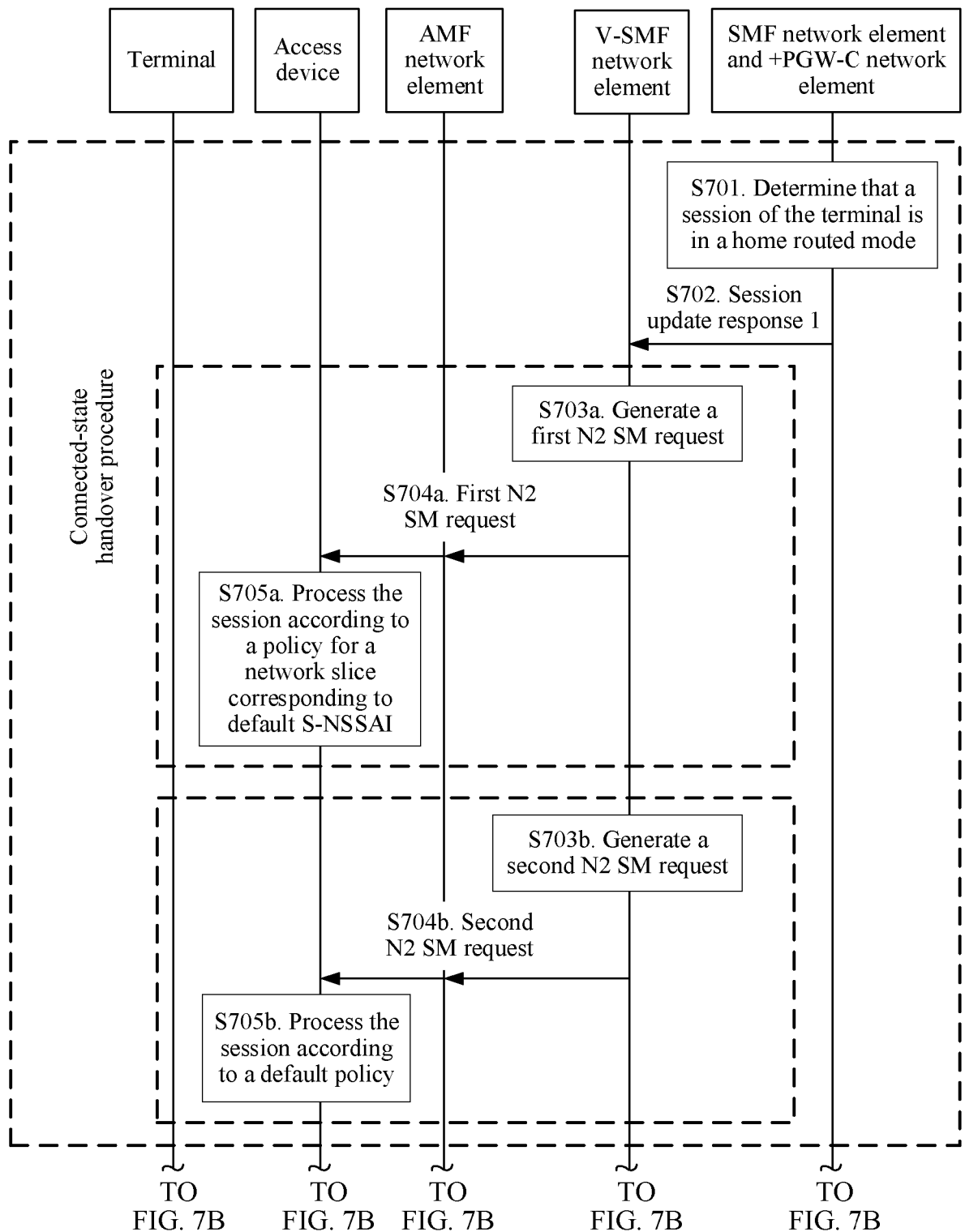
FIG. 7A and FIG. 7B are a first schematic flowchart of a handover method according to an embodiment of this application.
Figure 7B:
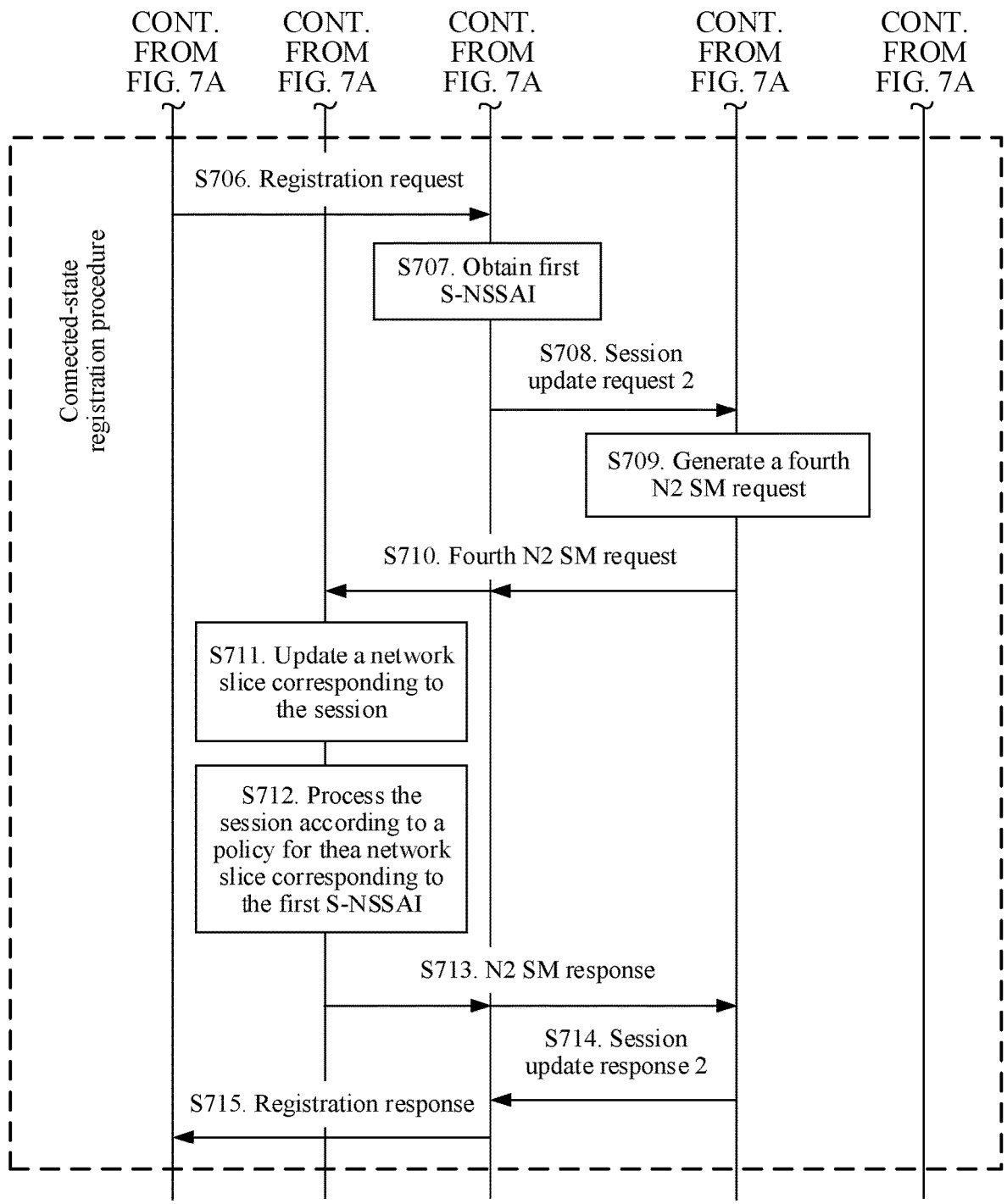

An example in which the handover system shown in FIG. 2 is applied to the architecture of interworking between the 4G network and the 5G network shown in FIG. 1 is used. FIG. 7A and FIG. 7B show a handover method according to an embodiment of this application. The handover method includes the following steps:

S701. In a connected-state handover procedure of a terminal, an SMF network element+PGW-C network element determines that a session of the terminal is in a home routed mode.

Optionally, in this embodiment of this application, the SMF network element+PGW-C network element may determine, based on a location of the terminal, that the session of the terminal is in the home routed mode. For example, when the terminal is located in a visited network, the SMF network element+PGW-C network element determines that the session of the terminal is in the home routed mode. Alternatively, the SMF network element+PGW-C network element may determine, based on information about a network element that sends a session update request 1 to the SMF network element+PGW-C network element, that the session is in the home routed mode. For example, when an internet protocol (IP) address of the network element that sends the session update request 1 to the SMF network element+PGW-C network element is not an IP address of a network element in a home network, or when a fully qualified domain name (FQDN) of the network element that sends the session update request 1 to the SMF network element+the PGW-C network element includes information about a visited network, the SMF network element+PGW-C network element determines that the session of the terminal is in the home routed mode. Alternatively, the SMF network element+PGW-C network element determines, depending on whether there is a V-SMF network element that serves the session of the terminal, whether the session of the terminal is in the home routed mode. For example, when there is a V-SMF network element, the SMF network element+ PGW-C network element determines that the session of the terminal is in the home routed mode. Certainly, the SMF network element+PGW-C network element may alternatively determine, in another manner, that the session of the terminal is in the home routed mode. For details, refer to an existing implementation. Details are not described herein.

S702. The SMF network element+PGW-C network element sends a session update response 1 to the V-SMF network element, so that the V-SMF network element receives the session update response 1 from the SMF network element+PGW-C network element.

The session update response 1 carries first indication information or second S-NSSAI, or the session update response 1 does not carry S-NSSAI.

For specific descriptions of the first indication information or the second S-NSSAI in this embodiment of this application, refer to the handover system part shown in FIG. 2. Details are not described herein again.

Optionally, in this embodiment of this application, if the session update response 1 carries the second S-NSSAI, the session update response 1 may further carry indication information of the home network of the terminal. For example, the indication information of the home network of the terminal may include an identifier of the home network of the terminal or other information that can indicate the home network of the terminal. This is not specifically limited in this embodiment of this application.

Optionally, in this embodiment of this application, if the session update response 1 carries the second S-NSSAI, the V-SMF network element may determine, in the following manners, that the second S-NSSAI is not S-NSSAI of the visited network of the terminal or the second S-NSSAI is S-NSSAI of the home network of the terminal.

Manner 1: The V-SMF network element determines, based on information about the SMF network element+ PGW-C network element, for example, an address or identifier of the SMF network element+PGW-C network element, that the session is in the home routed mode, to determine that the second S-NSSAI sent by the SMF network element+PGW-C network element to the V-SMF network element is not the S-NSSAI of the visited network of the terminal or is the S-NSSAI of the home network of the terminal. For example, the identifier of the SMF network element+PGW-C network element carries the indication information of the home network of the terminal, so that the V-SMF network element may determine that the session is in the home routed mode, to determine that the second S-NSSAI sent by the SMF network element+PGW-C network element to the V-SMF network element is not the S-NSSAI of the visited network of the terminal or is the S-NSSAI of the home network of the terminal.

Manner 2: The V-SMF network element determines, based on the indication information that is of the home network of the terminal and that is carried in the session update response 1, that the S-NSSAI sent by the SMF network element+PGW-C network element to the V-SMF network element is not the S-NSSAI of the visited network of the terminal or is the S-NSSAI of the home network of the terminal.

The foregoing provides only examples of two specific implementations of determining, by the V-SMF network element, that the second S-NSSAI is not the S-NSSAI of the visited network of the terminal or is the S-NSSAI of the home network of the terminal. Certainly, the V-SMF network element may alternatively determine, in another manner, that the second S-NSSAI is not the S-NSSAI of the visited network of the terminal or is the S-NSSAI of the home network of the terminal. This is not specifically limited in this embodiment of this application.

Further, after step S702, the handover method provided in this embodiment of this application may further include the following step S703a to step S705a.

S703a. The V-SMF network element generates a first N2 SM request based on the session update response 1.

The first N2 SM request carries default S-NSSAI corresponding to the session, and is used to indicate to an access device to process the session according to a policy for a network slice corresponding to the default S-NSSAI.

For specific descriptions of the default S-NSSAI in this embodiment of this application, refer to the handover system part shown in FIG. 2. Details are not described herein again.

S704a. The V-SMF network element sends the first N2 SM request to the access device of the terminal through an AMF network element, so that the access device receives the first N2 SM request from the V-SMF network element.

S705a. The access device processes the session according to the policy for the network slice corresponding to the default S-NSSAI in the first N2 SM request.

Alternatively, optionally, after step S702, the handover method provided in this embodiment of this application may further include the following step S703b to step S705b.

S703b. The V-SMF network element generates a second N2 SM request based on the session update response 1.

The second N2 SM request carries the first indication information or does not carry S-NSSAI, and is used to indicate to an access device to process the session according to a default policy.

For specific descriptions of the default policy in this embodiment of this application, refer to the handover system part shown in FIG. 2. Details are not described herein again.

S704b. The V-SMF network element sends the second N2 SM request to the access device of the terminal through an AMF network element, so that the access device receives the second N2 SM request from the V-SMF network element.

S705b. The access device processes the session by using the default policy based on the second N2 SM request.

Step S702 and step S703a to step S705a or step S703b to step S705b provide only an example of a specific implementation of sending, by the SMF network element+PGW-C network element, the session update response 1 to the V-SMF network element after the SMF network element+ PGW-C network element determines that the session of the terminal is in the home routed mode, and generating the first N2 SM request or the second N2 SM request based on the session update response 1. Optionally, in this embodiment of this application, alternatively, the SMF network element+ PGW-C network element may generate a third N2 SM request after determining that the session of the terminal is in the home routed mode, and send the third N2 SM request to the V-SMF network element, where the third N2 SM request carries the default S-NSSAI corresponding to the session or the first indication information, or does not carry S-NSSAI; and further, the V-SMF network element generates the first N2 SM request or the second N2 SM request based on the third N2 SM request. This is not specifically limited in this embodiment of this application.

Optionally, in this embodiment of this application, if the session update response 1 in step S702 carries the second S-NSSAI, the V-SMF network element further sends the second S-NSSAI to the AMF network element, and the AMF network element stores the second S-NSSAI. This is not specifically limited in this embodiment of this application.

Optionally, in this embodiment of this application, if the session update response 1 in step S702 carries the indication information of the home network of the terminal, the V-SMF network element further sends the indication information of the home network of the terminal to the AMF network element, and the AMF network element stores the indication information of the home network of the terminal. This is not specifically limited in this embodiment of this application.

Step S701 to step S705a or step S701 to step S705b are optional steps of this embodiment of this application. Step S701 is performed after the SMF network element+PGW-C network element receives the session update request 1 from the V-SMF network element in the connected-state handover procedure of the terminal. Certainly, another step may be further included in the connected-state handover procedure of the terminal. For details, refer to an existing connected-state handover procedure. Details are not described herein.

Based on the foregoing steps, before obtaining the first S-NSSAI corresponding to the session of the terminal, the access device can process the session by using the policy for the network slice corresponding to the default S-NSSAI, or the access device can process the session by using the default policy. Therefore, a problem of a session handover failure caused because the V-SMF cannot obtain the first S-NSSAI corresponding to the session of the terminal, and sends the second S-NSSAI corresponding to the session of the terminal to the access device can be avoided.

Optionally, the handover method provided in this embodiment of this application may further include the following steps:

S706. The terminal sends a registration request to the AMF network element, so that the AMF network element receives the registration request from the terminal.

Optionally, in a possible implementation, the registration request may carry the second S-NSSAI, the indication information of the home network of the terminal, and a session identifier of the session, and the session identifier is used to associate the first S-NSSAI with the session.

Optionally, in a possible implementation, the terminal may store a correspondence between the first S-NSSAI and the second S-NSSAI, so that the terminal may determine the first S-NSSAI based on the second S-NSSAI and the correspondence, and further add the second S-NSSAI and the first S-NSSAI to the registration request, or add the first S-NSSAI and the session identifier of the session to the registration request. This is not specifically limited in this embodiment of this application.

Certainly, in this embodiment of this application, the registration request may not carry S-NSSAI. This is not specifically limited in this embodiment of this application.

S707. If the session is in the home routed mode, the AMF network element obtains the first S-NSSAI corresponding to the session of the terminal.

In a possible implementation, if the registration request carries the first S-NSSAI, the AMF network element may obtain the first S-NSSAI from the registration request.

In a possible implementation, if the registration request carries the second S-NSSAI, the indication information of the home network of the terminal, and the session identifier of the session, the AMF network element may obtain the first S-NSSAI based on the second S-NSSAI and the indication information of the home network.

In a possible implementation, if the registration request carries neither the first S-NSSAI nor the second S-NSSAI, the AMF network element may obtain the first S-NSSAI based on the second S-NSSAI and the indication information of the home network that are obtained from the connected-state handover procedure.

Optionally, in this embodiment of this application, the obtaining, by the AMF network element, the first S-NSSAI based on the second S-NSSAI and the indication information of the home network may specifically include: determining, by the AMF network element, the first S-NSSAI based on the second S-NSSAI, the indication information of the home network, and a locally configured correspondence between the second S-NSSAI and the first S-NSSAI.

Alternatively, optionally, in this embodiment of this application, the obtaining, by the AMF network element, the first S-NSSAI based on the second S-NSSAI and the indication information of the home network may specifically include: sending, by the AMF network element, a request message to an NSSF network element, where the request message carries the second S-NSSAI and the indication information of the home network, and is used to request the first S-NSSAI; and after receiving the request message from the AMF network element, determining, by the NSSF network element, the first S-NSSAI based on the second S-NSSAI, the indication information of the home network, and a locally configured correspondence between the second S-NSSAI and the first S-NSSAI, and sending the first S-NSSAI to the AMF network element, so that the AMF network element receives the first S-NSSAI from the NSSF network element.

Optionally, in this embodiment of this application, the AMF network element may determine, in the following manner, that the session is in the home routed mode:

Manner 1: The AMF network element may determine, based on the information about the SMF network element+PGW-C network element, for example, the identifier or the address of the SMF network element+PGW-C network element, that the session is in the home routed mode. For example, the identifier of the SMF network element+PGW-C network element carries the indication information of the home network of the terminal, so that the AMF network element may determine that the session is in the home routed mode.

Manner 2: The AMF network element may determine, based on the indication information that is of the home network of the terminal and that is carried in the registration request or the indication information that is of the home network of the terminal and that is obtained from the connected-state handover procedure, that the session is in the home routed mode.

The foregoing provides only examples of two specific implementations of determining, by the AMF network element, that the session is in the home routed mode. Certainly, the AMF network element may alternatively determine, in another manner, that the session is in the home routed mode. This is not specifically limited in this embodiment of this application.

S708. The AMF network element sends a session update request 2 to the V-SMF network element, so that the V-SMF network element receives the session update request 2 from the AMF network element.

The session update request 2 carries the first S-NSSAI corresponding to the session of the terminal.

S709. The V-SMF network element generates a fourth N2 SM request based on the session update request 2.

The fourth N2 SM request carries the first S-NSSAI corresponding to the session of the terminal and the session identifier.

Optionally, in this embodiment of this application, after receiving the session update request 2 from the AMF network element, the V-SMF network element may determine that the first NSSAI in the session update request 2 is different from the second S-NSSAI carried in the session update response 1 in step S702, and then generate the fourth N2 SM request based on the session update request 2. This is not specifically limited in this embodiment of this application.

Alternatively, optionally, after receiving the session update request 2 from the AMF network element, if determining that the session update response 1 does not carry S-NSSAI or the session update response 1 carries the first indication information, the V-SMF network element may generate the fourth N2 SM request based on the session update request 2. This is not specifically limited in this embodiment of this application.

S710. The V-SMF network element sends the fourth N2 SM request to the access device of the terminal through the AMF network element, so that the access device receives the fourth N2 SM request from the V-SMF network element.

S711. The access device updates, based on the fourth N2 SM request, a network slice corresponding to the session with a network slice corresponding to the first S-NSSAI.

S712. The access device processes the session according to a policy for the network slice corresponding to the first S-NS SAI For example, the access device may adjust a corresponding resource for the session according to the policy for the network slice corresponding to the first S-NSSAI.

S713. The access device sends an N2 SM response to the V-SMF network element through the AMF network element, so that the V-SMF network element receives the N2 SM response from the access device.

Optionally, in this embodiment of this application, if the access device determines, based on the first S-NSSAI corresponding to the session, that an air interface corresponding to the session needs to be released (for example, the air interface corresponding to the session needs to be released because of a congestion of a slice in which the session is located), the access device may notify the V-SMF network element in the N2 SM response, and add a corresponding cause value to the N2 SM response. Further, the V-SMF network element may perform a corresponding operation based on the received N2 SM response, for example, release the session or deactivate the session. This is not specifically limited in this embodiment of this application.

S714. The V-SMF network element sends a session update response 2 to the AMF network element, so that the AMF network element receives the session update response 2 from the V-SMF network element.

S715. The AMF network element sends a registration response to the terminal, so that the terminal receives the registration response from the AMF network element.

Optionally, in this embodiment of this application, the registration response may carry the first S-NSSAI and the second S-NSSAI, so that the terminal can associate the first S-NSSAI with the session of the terminal based on the correspondence between the first S-NSSAI and the second S-NSSAI, for use in a subsequent procedure. Alternatively, the registration response may carry the first S-NSSAI and the session identifier, so that the terminal can associate the first S-NSSAI with the session of the terminal, for use in a subsequent procedure. This is not specifically limited in this embodiment of this application.

It should be noted that step S706 to step S715 provide only an example of a specific implementation of updating, by the access device in the connected-state registration procedure of the terminal, the S-NSSAI corresponding to the session of the terminal. Certainly, another step may be further included in the connected-state registration procedure of the terminal, for example, the AMF network element is registered with a UDM network element. For details, refer to an existing connected-state registration procedure. Details are not described herein.

Based on this solution, on one hand, when the terminal is handed over from the 4G network the 5G network, a problem of a session handover failure caused because the V-SMF network element cannot obtain the S-NSSAI that is of the visited network of the terminal and that is corresponding to the session of the terminal, and sends the second S-NSSAI corresponding to the session of the terminal to the access device can be avoided, so that the access device can process the session according to the policy for the network slice corresponding to the first S-NSSAI. On the other hand, because the first S-NSSAI corresponding to the session of the terminal does not need to be obtained from the connected-state handover procedure of the terminal, a delay of the connected-state handover procedure can also be reduced. For analysis of a related technical effect, refer to the handover system part shown in FIG. 2. Details are not described herein again.

The actions of the AMF network element, the V-SMF network element, or the SMF network element+PGW-C network element in step S701 to step S715 may be performed by the processor 601 in the communications device 600 shown in FIG. 6 by invoking the application program code stored in the memory 603. This is not limited in this embodiment.

Figure 8:
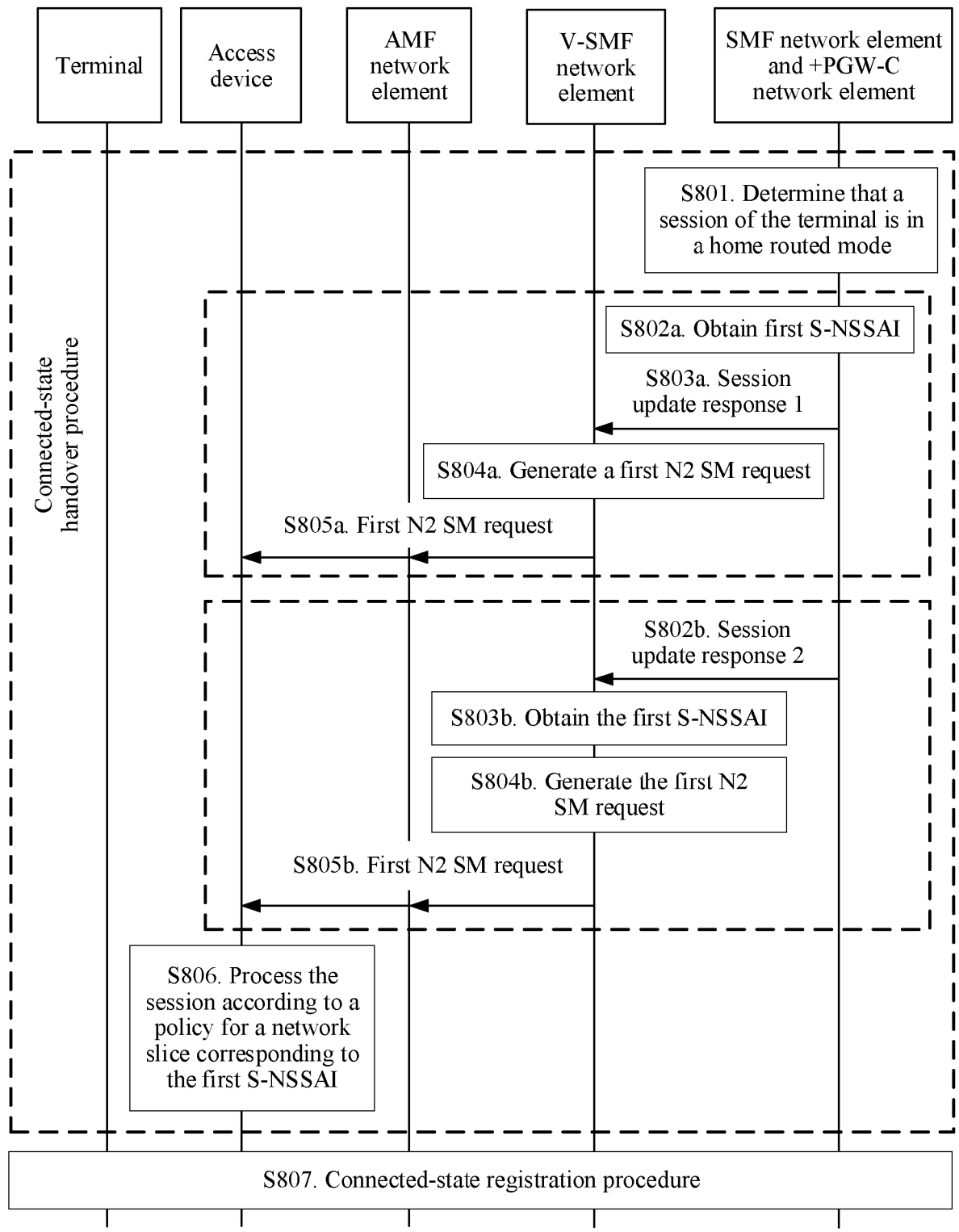
FIG. 8 is a second schematic flowchart of a handover method according to an embodiment of this application.

An example in which the handover system shown in FIG. 3, FIG. 4, or FIG. 5 is applied to the architecture of interworking between the 4G network and the 5G network shown in FIG. 1 is used. FIG. 8 shows another handover method according to an embodiment of this application. The handover method includes the following steps:

S801. This step is the same as step S701. For related descriptions, refer to the embodiment shown in FIG. 7A and FIG. 7B. Details are not described herein again.

In a possible implementation, the handover method provided in this embodiment of this application may further include the following step S802*a* to step S805*a*.

S802*a*. The SMF network element+PGW-C network element obtains first S-NSSAI corresponding to the session of the terminal, where the first S-NSSAI is S-NSSAI of a visited network of the terminal.

In a possible implementation, the obtaining, by the SMF network element+PGW-C network element, first S-NSSAI corresponding to the session of the terminal includes: obtaining, by the SMF network element+PGW-C network element, second S-NSSAI corresponding to the session of the terminal and indication information of the visited network of the terminal; and determining the first S-NSSAI based on the second S-NSSAI, the indication information of the visited network of the terminal, and a locally configured correspondence between the second S-NSSAI and the first S-NSSAI.

Alternatively, in a possible implementation, the obtaining, by the SMF network element+PGW-C network element, first S-NSSAI corresponding to the session of the terminal includes: obtaining, by the SMF network element+PGW-C network element, second S-NSSAI corresponding to the session of the terminal and indication information of the visited network of the terminal, and sending a request message to an NSSF network element, where the request message carries the second S-NSSAI and the indication information of the visited network of the terminal, and is used to request the first S-NSSAI; and after receiving the request message from the SMF network element+PGW-C network element, determining, by the NSSF network element, the first S-NSSAI based on the second S-NSSAI, the indication information of the visited network of the terminal, and a locally configured correspondence between the second S-NSSAI and the first S-NSSAI, and sending the first S-NSSAI to the SMF network element+PGW-C network element, so that the SMF network element+PGW-C network element receives the first S-NSSAI from the NSSF network element.

Optionally, in this embodiment of this application, the SMF network element+PGW-C network element may further obtain indication information of a home network of the terminal, and the request message sent to the NSSF network element may further carry the indication information of the home network of the terminal, and the indication information of the home network of the terminal is used to indicate that the second S-NSSAI is S-NSSAI of the home network of the terminal. This is not specifically limited in this embodiment of this application.

S803a. The SMF network element+PGW-C network element sends a session update response 1 to a V-SMF network element, so that the V-SMF network element receives the session update response 1 from the SMF network element+PGW-C network element.

Optionally, in a possible implementation, an N2 SM request in the session update response 1 carries the first S-NSSAI. In this case, optionally, in addition to the N2 SM request, the session update response 1 may further carry the first S-NSSAI and the second S-NSSAI that are corresponding to the session.

Optionally, in another possible implementation, the session update response 1 does not carry the N2 SM message, but carries the first S-NSSAI and the second S-NSSAI that are corresponding to the session.

If the V-SMF network element may receive the first S-NSSAI and the second S-NSSAI from the SMF network element+PGW-C network element, optionally, the V-SMF network element may send an N11 message to an AMF network element. The N11 message carries the first S-NSSAI and the second S-NSSAI. Therefore, after receiving the first S-NSSAI and the second S-NSSAI from the V-SMF network element, the AMF network element may store the first S-NSSAI and the second S-NSSAI, for use in a subsequent procedure. This is not specifically limited in this embodiment of this application.

S804a. The V-SMF network element generates a first N2 SM request based on the session update response 1.

The first N2 SM request carries the first S-NSSAI corresponding to the session, and is used to indicate a network slice corresponding the session of the terminal.

S805a. The V-SMF network element sends the first N2 SM request to an access device of the terminal through the AMF network element, so that the access device receives the first N2 SM request from the V-SMF network element.

Alternatively, in a possible implementation, the handover method provided in this embodiment of this application may further include the following step S802b to step S805b.

S802b. The SMF network element+PGW-C network element sends a session update response 2 to the V-SMF network element, so that the V-SMF network element receives the session update response 2 from the SMF network element+PGW-C network element.

The session update response 2 carries the second S-NSSAI, and the second S-NSSAI is S-NSSAI of a home network of the terminal.

Optionally, the session update response 2 in this embodiment of this application may further carry indication information of the home network of the terminal. This is not specifically limited in this embodiment of this application.

Optionally, in this embodiment of this application, for a manner in which the V-SMF network element determines that the second S-NSSAI is not S-NSSAI of a visited network of the terminal or is the S-NSSAI of the home network of the terminal, refer to step S702 in the embodiment shown in FIG. 7A and FIG. 7B. Details are not described herein again.

S803b. The V-SMF network element obtains the first S-NSSAI corresponding to the session of the terminal.

In a possible implementation, the obtaining, by the V-SMF network element, the first S-NSSAI corresponding to the session of the terminal includes: determining, by the V-SMF network element, the first S-NSSAI based on the second S-NSSAI corresponding to the session of the terminal, the indication information of the home network of the terminal, and a locally configured correspondence between the second S-NSSAI and the first S-NSSAI.

Alternatively, in a possible implementation, the obtaining, by the V-SMF network element, the first S-NSSAI corresponding to the session of the terminal includes: sending, by the V-SMF network element, a request message to an NS SF network element or an AMF network element, where the request message carries the second S-NSSAI corresponding to the session of the terminal and the indication information of the home network of the terminal, and is used to request the first S-NSSAI corresponding to the session of the terminal; and after receiving the request message from the V-SMF network element, determining, by the NSSF network element or the AMF network element, the first S-NS-SAI based on the second S-NSSAI, the indication information of the home network, and a locally configured correspondence between the second S-NSSAI and the first S-NSSAI, and sending the first S-NSSAI to the V-SMF network element, so that the V-SMF network element receives the first S-NSSAI from the NSSF network element or the AMF network element.

S804b and S805b. The steps are the same as step S804a and step S805a. For related descriptions, refer to step S804a and step S805a. Details are not described herein again.

Optionally, in this embodiment of this application, after the V-SMF network element obtains the first S-NS SAT, the V-SMF network element may send an N11 message to the AMF network element, where the N11 message carries the first S-NSSAI and the second S-NSSAI. Therefore, after receiving the first S-NSSAI and the second S-NSSAI from the V-SMF network element, the AMF network element may store the first S-NSSAI and the second S-NSSAI, for use in a subsequent procedure. This is not specifically limited in this embodiment of this application.

Further, the handover method provided in this embodiment of this application may further include the following step:

S806. This step is the same as step S712. For related descriptions, refer to the embodiment shown in FIG. 7A and FIG. 7B. Details are not described herein again.

Optionally, in this embodiment of this application, the access device may further send the first S-NSSAI and the second S-NSSAI to the terminal, so that the terminal can associate the first S-NSSAI with the session of the terminal based on the correspondence between the first S-NSSAI and the second S-NSSAI, for use in a subsequent procedure. Alternatively, the access device may send the first S-NSSAI and the session identifier to the terminal, so that the terminal can associate the first S-NSSAI with the session of the terminal, for use in a subsequent procedure. This is not specifically limited in this embodiment of this application.

Optionally, the handover method provided in this embodiment of this application may further include the following step:

S807: a connected-state registration procedure of the terminal.

For the connected-state registration procedure of the terminal, refer to an existing implementation. Details are not described herein.

Based on this solution, when the terminal is handed over from the 4G network to the 5G network, a problem of a session handover failure caused because the V-SMF network element cannot obtain the S-NSSAI that is of the visited network of the terminal and that is corresponding to the session of the terminal, and sends the second S-NSSAI corresponding to the session of the terminal to the access device can be avoided, so that the access device can process the session according to a policy for a network slice corresponding to the first S-NSSAI. For analysis of a related technical effect, refer to the handover system part shown in FIG. 3, FIG. 4, or FIG. 5. Details are not described herein again.

The actions of the AMF network element, the V-SMF network element, or the SMF network element+PGW-C network element in step S801 to step S807 may be performed by the processor 601 in the communications device 600 shown in FIG. 6 by invoking the application program code stored in the memory 603. This is not limited in this embodiment.

Figure 9A:
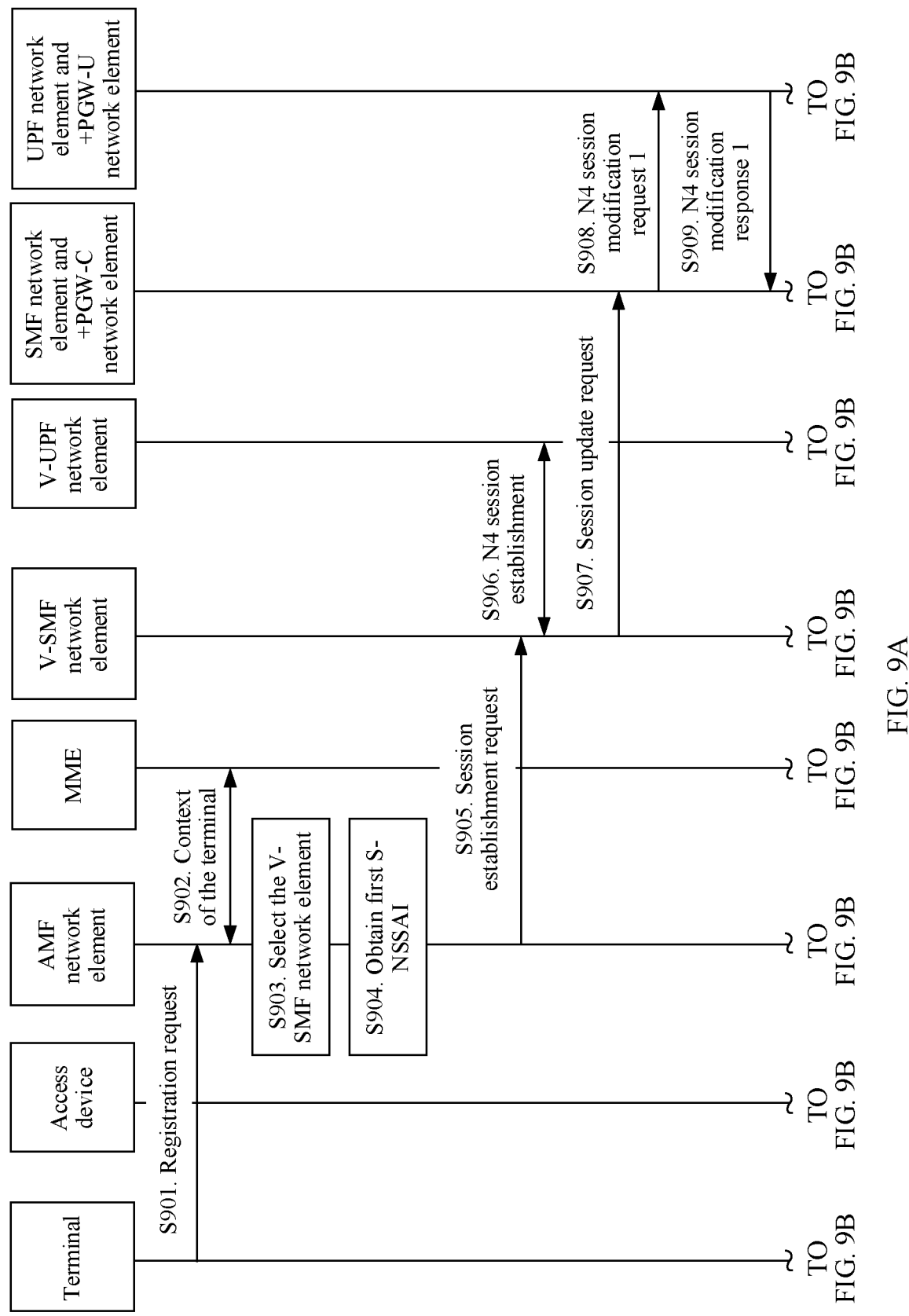

An example in which the handover system shown in FIG. 2 is applied to the architecture of interworking between the 4G network and the 5G network shown in FIG. 1 is used. FIG. 9A and FIG. 9B show another handover method according to an embodiment of this application. The handover method is applied to an idle-state registration procedure of a terminal, and includes the following steps:

S901. This step is similar to step S706. For example, a difference lies in that the session identifier in step S706 includes at least one of a packet session unit (packet data unit, PDU) session identifier (session ID) or a default bearer identifier. A session identifier in step S901 includes a default bearer identifier, and optionally may further include a PDU session identifier. The default bearer identifier is used to associate first S-NSSAI obtained in the subsequent step S904 with a session of the terminal. For other related descriptions, refer to step S706. Details are not described herein again.

S902. The AMF network element obtains a context of the terminal from an MME.

The context of the terminal includes a session context of the terminal. The session context includes information about an SMF network element+PGW-C network element corresponding to the session, for example, an address and identifier of the SMF network element+PGW-C network element. This is not specifically limited in this embodiment of this application. Certainly, the session context may further include other information, such as a default bearer identifier of the session. For related descriptions, refer to an existing implementation. Details are not described herein.

In addition, for a specific implementation of step S902, refer to an existing implementation. Details are not described herein.

S903. The AMF network element selects a V-SMF network element.

For a related implementation of step S903, refer to an existing implementation. Details are not described herein.

S904. This step is similar to step S707. For example, a difference lies in that the second S-NSSAI and the indication information of the home network of the terminal that are obtained by the AMF network element from step S707 may be obtained from the connected-state handover procedure or the registration request, but second S-NSSAI and indication information of a home network of the terminal that are obtained by the AMF network element from step S904 are obtained from a registration request. For other related descriptions, refer to step S707. Details are not described herein again.

It should be noted that in this embodiment of this application, step S903 and step S904 are not performed in a necessary sequence. Step S903 may be performed before step S904, step S904 may be performed before step S903, or step S903 and step S904 may be simultaneously performed. This is not specifically limited in this embodiment of this application.

S905. The AMF network element sends a session establishment request to the V-SMF network element, so that the V-SMF network element receives the session establishment request from the AMF network element.

The session establishment request carries the first S-NSSAI and the second S-NSSAI corresponding to the session of the terminal.

Optionally, in this embodiment of this application, the session establishment request may further carry the session context of the terminal and other information that are obtained by the AMF network element from the MME. For details, refer to an existing implementation. Details are not described herein.

S906. The V-SMF network element selects a V-UPF network element, and requests the V-UPF network element to create a related resource for the session.

For related implementation of step S906, refer to an existing implementation. Details are not described herein.

S907. The V-SMF network element sends a session update request to the SMF network element+PGW-C network element, so that the SMF network element+PGW-C network element receives the session update request from the V-SMF network element.

The session update request carries the second S-NSSAI corresponding to the session of the terminal.

Optionally, in this embodiment of this application, the session update request may further carry the session context of the terminal and other information that are obtained by the AMF network element from the MME. For details, refer to an existing implementation. Details are not described herein.

S908. The SMF network element+PGW-C network element determines the corresponding session based on the default bearer identifier in the session context received from the V-SMF network element, and sends an N4 session modification request 1 to a UPF network element+PGW-U network element, so that the UPF network element+PGW-U network element receives the N4 session modification request 1 from the SMF network element+PGW-C network element.

S909. The UPF network element+PGW-U network element sends an N4 session modification response 1 to the SMF network element+PGW-C network element, so that the SMF network element+PGW-C network element receives the N4 session modification response 1 from the UPF network element+the PGW-U network element.

S910. The SMF network element+PGW-C network element sends a session update response to the V-SMF network element, so that the V-SMF network element receives the session update response from the SMF network element+PGW-C network element.

Optionally, in this embodiment of this application, if the terminal indicates that the session is a session to be activated, the handover method provided in this embodiment of this application may further include the following steps:

S911. The V-SMF network element generates a first N2 SM request. The first N2 SM request carries the first S-NSSAI corresponding to the session of the terminal.

S912. The V-SMF network element sends the first N2 SM request to an access device of the terminal through the AMF network element, so that the access device receives the first N2 SM request from the V-SMF network element.

S913. This step is the same as step S712. For related descriptions, refer to the embodiment shown in FIG. 7A and FIG. 7B. Details are not described herein again.

S914. This step is similar to step S713. For example, a difference lies in that the N2 SM response in step S713 is a response to the fourth N2 SM request in step S710, and an N2 SM response in step S914 is a response to the first N2 SM request in step S912. For other related descriptions, refer to step S713. Details are not described herein again.

Optionally, in this embodiment of this application, if the access device successfully allocates a resource to the session, the handover method provided in this embodiment of this application may further include the following step S915 and step S916.

S915. The V-SMF network element sends an N4 session modification request 2 to the V-UPF network element, so that the V-UPF network element receives the N4 session modification request 2 from the V-SMF network element.

S916. The V-UPF network element sends an N4 session modification response 2 to the V-SMF network element, so that the V-SMF network element receives the N4 session modification response 2 from the V-UPF network element.

Steps S915 and S916 are used to create a downlink tunnel from the V-UPF network element to the access device. For related implementation, refer to an existing implementation. Details are not described herein.

Optionally, the handover method provided in this embodiment of this application may further include the following steps:

S917. The V-SMF network element sends a session establishment response to the AMF network element, so that the AMF network element receives the session establishment response from the V-SMF network element.

S918. The AMF network element sends a registration response to the terminal, so that the terminal receives the registration response from the AMF network element.

Optionally, in this embodiment of this application, the registration response may carry the first S-NSSAI and the second S-NSSAI, so that the terminal can associate the first S-NSSAI with the session of the terminal based on the correspondence between the first S-NSSAI and the second S-NSSAI, for use in a subsequent procedure. Alternatively, the registration response may carry the first S-NSSAI and the session identifier, so that the terminal can associate the first S-NSSAI with the session of the terminal, for use in a subsequent procedure. This is not specifically limited in this embodiment of this application.

It should be noted that step S901 to step S918 provide only an example of a specific implementation of obtaining, by the access device in the registration procedure of the terminal, the first S-NSSAI corresponding to the session of the terminal. Certainly, another step may be further included in the registration procedure of the terminal, for example, the AMF network element is registered with a UDM network element. For details, refer to an existing registration procedure. Details are not described herein.

Based on this solution, when the terminal is handed over from the 4G network to the 5G network, a problem of a session handover failure caused because the V-SMF network element cannot obtain the S-NSSAI that is of the visited network of the terminal and that is corresponding to the session of the terminal, and sends the second S-NSSAI corresponding to the session of the terminal to the access device can be avoided, so that the access device can process the session according to a policy for a network slice corresponding to the first S-NSSAI. For analysis of a related technical effect, refer to the handover system part shown in FIG. 2. Details are not described herein again.

The actions of the AMF network element, the V-SMF network element, or the SMF network element+PGW-C network element in step S901 to step S918 may be performed by the processor 601 in the communications device 600 shown in FIG. 6 by invoking the application program code stored in the memory 603. This is not limited in this embodiment.

Figure 10A:
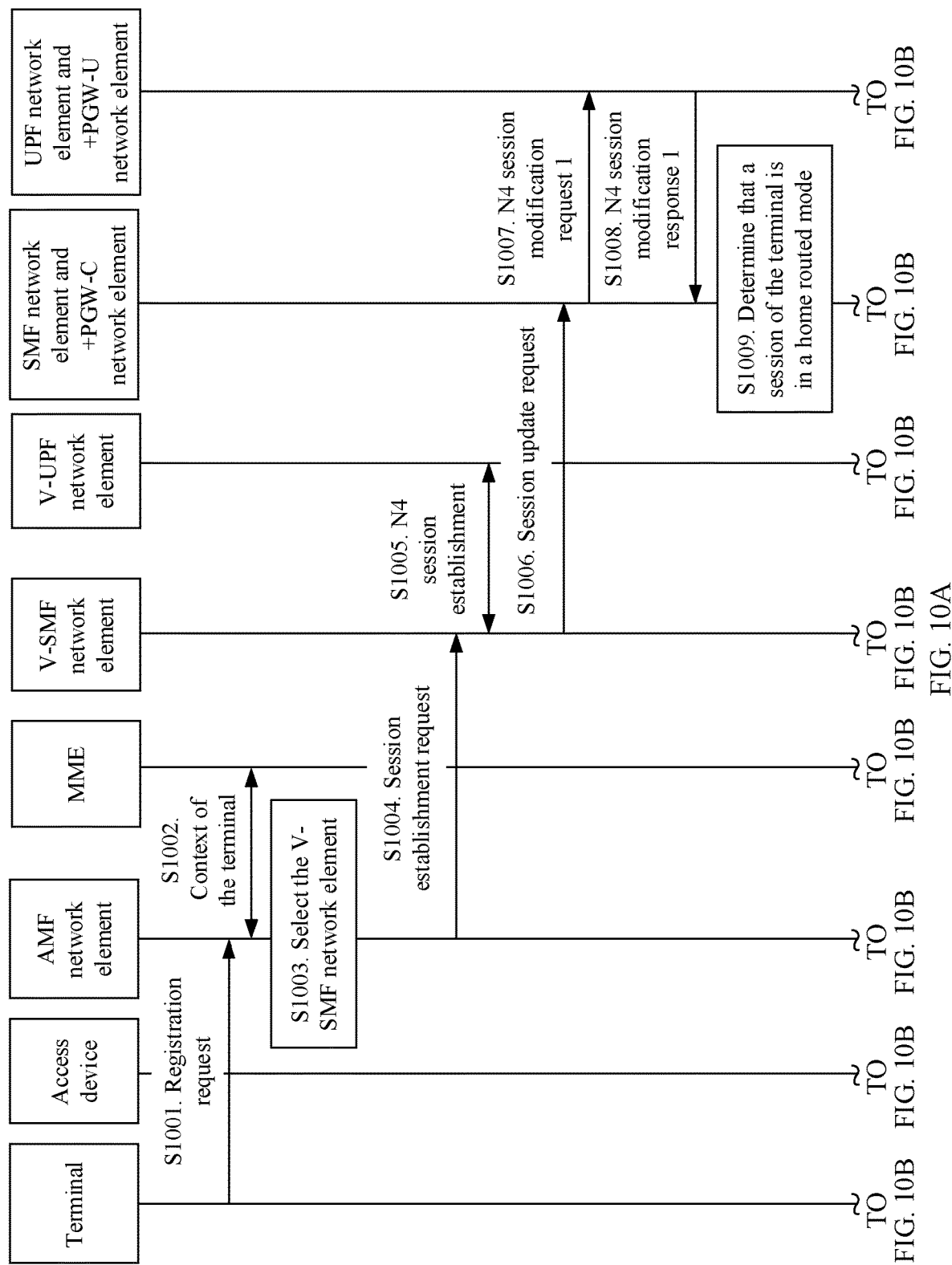
FIG. 10A to FIG. 10C are a fourth schematic flowchart of a handover method according to an embodiment of this application.
Figure 10B:
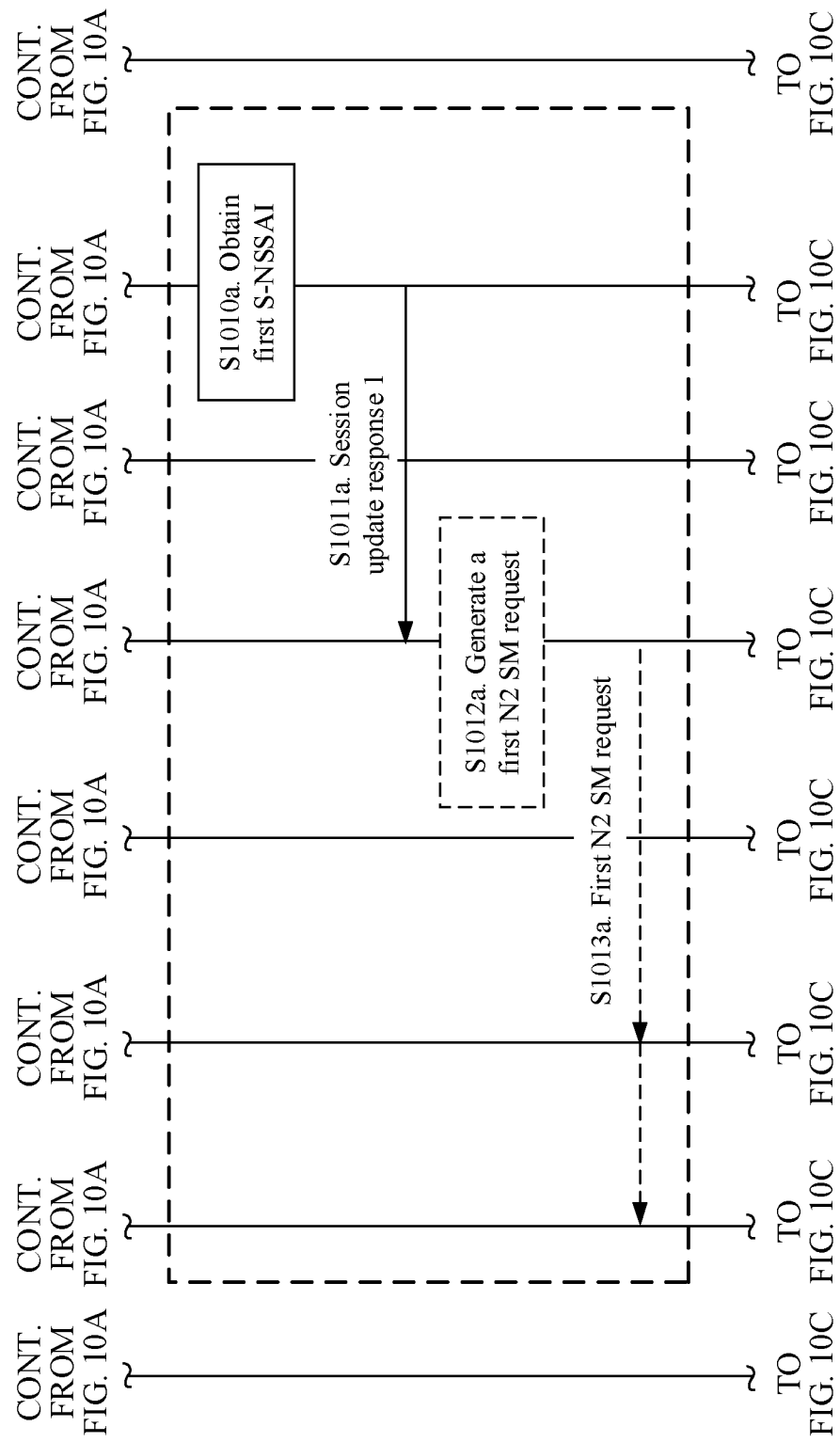
Figure 10C:
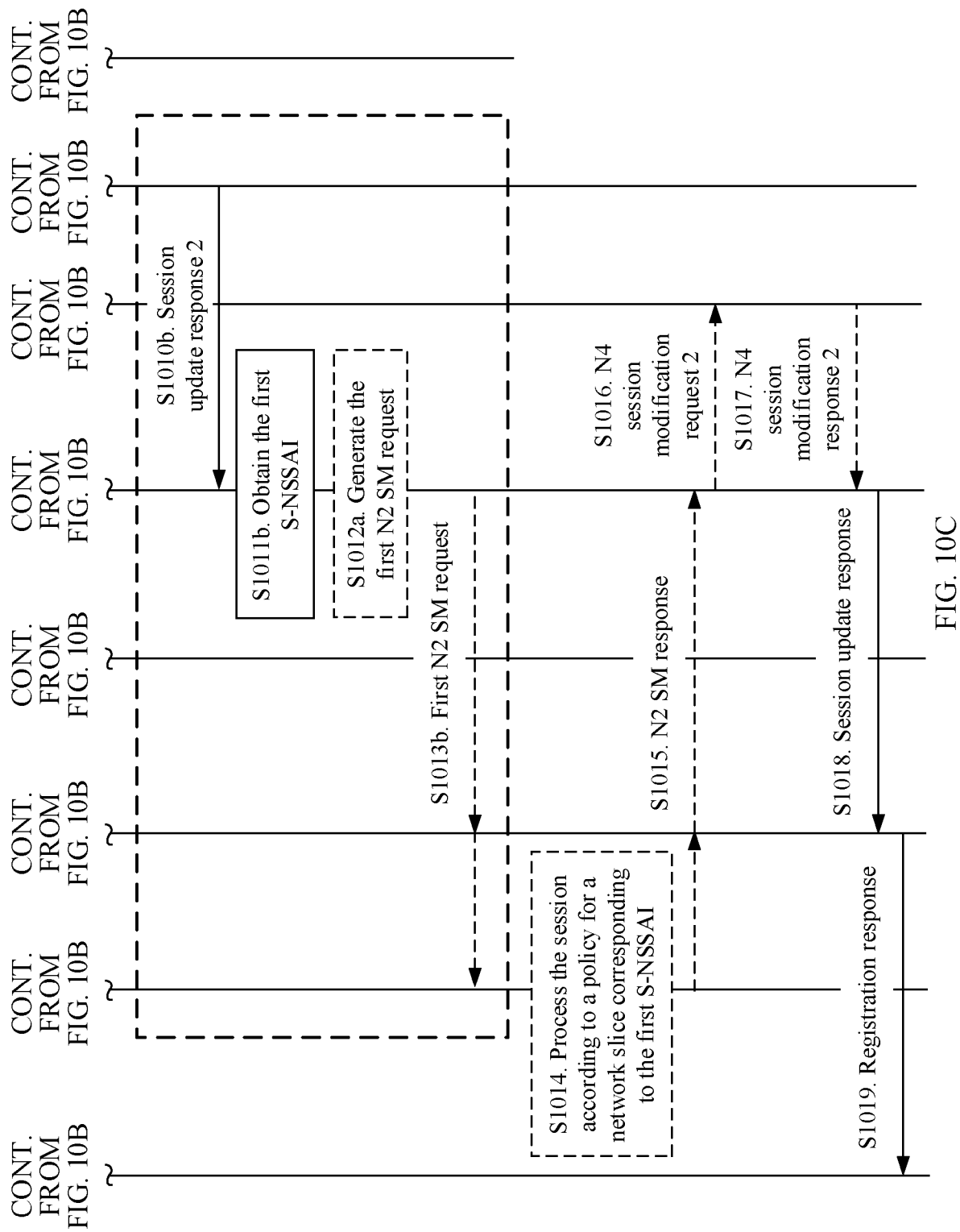

An example in which the handover system shown in FIG. 3, FIG. 4, or FIG. 5 is applied to the architecture of interworking between the 4G network and the 5G network shown in FIG. 1 is used. FIG. 10A to FIG. 10C show another handover method according to an embodiment of this application. The handover method is applied to an idle-state registration procedure of a terminal, and includes the following steps:

S1001. The terminal sends a registration request to an AMF network element, so that the AMF network element receives the registration request from the terminal.

S1002. The AMF network element obtains a context of the terminal from an MME.

S1003. The AMF network element selects a V-SMF network element.

S1004. The AMF network element sends a session establishment request to the V-SMF network element, so that the V-SMF network element receives the session establishment request from the AMF network element.

S1005. The V-SMF network element selects a V-UPF network element, and requests the V-UPF network element to create a related resource for a session.

S1006. The V-SMF network element sends a session update request to an SMF network element+PGW-C network element, so that the SMF network element+PGW-C network element receives the session update request from the V-SMF network element.

S1007. The SMF network element+PGW-C network element determines the corresponding session based on a default bearer identifier in the session context received from the V-SMF network element, and sends an N4 session modification request 1 to a UPF network element+PGW-U network element, so that the UPF network element+PGW-U network element receives the N4 session modification request 1 from the SMF network element+PGW-C network element.

S1008. The UPF network element+PGW-U network element sends an N4 session modification response 1 to the SMF network element+PGW-C network element, so that the SMF network element+PGW-C network element receives the N4 session modification response 1 from the UPF network element+PGW-U network element.

For specific implementations of step S1001 to step S1008, refer to an existing implementation. Details are not described herein.

S1009 to S1014. The steps are similar to step S801 to step S806. For example, a difference lies in that in this embodiment of this application, step S1012a and step S1013a or step S1012b and step S1013b, and step S1014 are all optional steps, and the foregoing steps are performed only when the session of the terminal is a session to be activated. Descriptions are uniformly provided herein, and details are not described below again.

Optionally, the handover method provided in this embodiment of this application may further include the following steps:

S1015 to S1019. The steps are the same as step S914 to step S918. For related descriptions, refer to the embodiment shown in FIG. 9A and FIG. 9B. Details are not described herein again.

It should be noted that step S1001 to step S1019 provide only an example of a specific implementation of obtaining, by an access device in the idle-state registration procedure of the terminal, first S-NSSAI corresponding to the session of the terminal. Certainly, another step may be further included in the idle-state registration procedure of the terminal, for example, the AMF network element is registered with a UDM network element. For details, refer to an existing idle-state registration procedure. Details are not described herein.

Based on this solution, when the terminal is handed over from the 4G network to the 5G network, a problem of a session handover failure caused because the V-SMF network element cannot obtain the S-NSSAI that is of a visited network of the terminal and that is corresponding to the session of the terminal, and sends second S-NSSAI corresponding to the session of the terminal to the access device can be avoided, so that the access device can process the session according to a policy for a network slice corresponding to the first S-NSSAI. For analysis of a related technical effect, refer to the handover system part shown in FIG. 3, FIG. 4, or FIG. 5. Details are not described herein again.

The actions of the AMF network element, the V-SMF network element, or the SMF network element+PGW-C network element in step S1001 to step S1019 may be performed by the processor 601 in the communications device 600 shown in FIG. 6 by invoking the application program code stored in the memory 603. This is not limited in this embodiment.

Figure 11A:
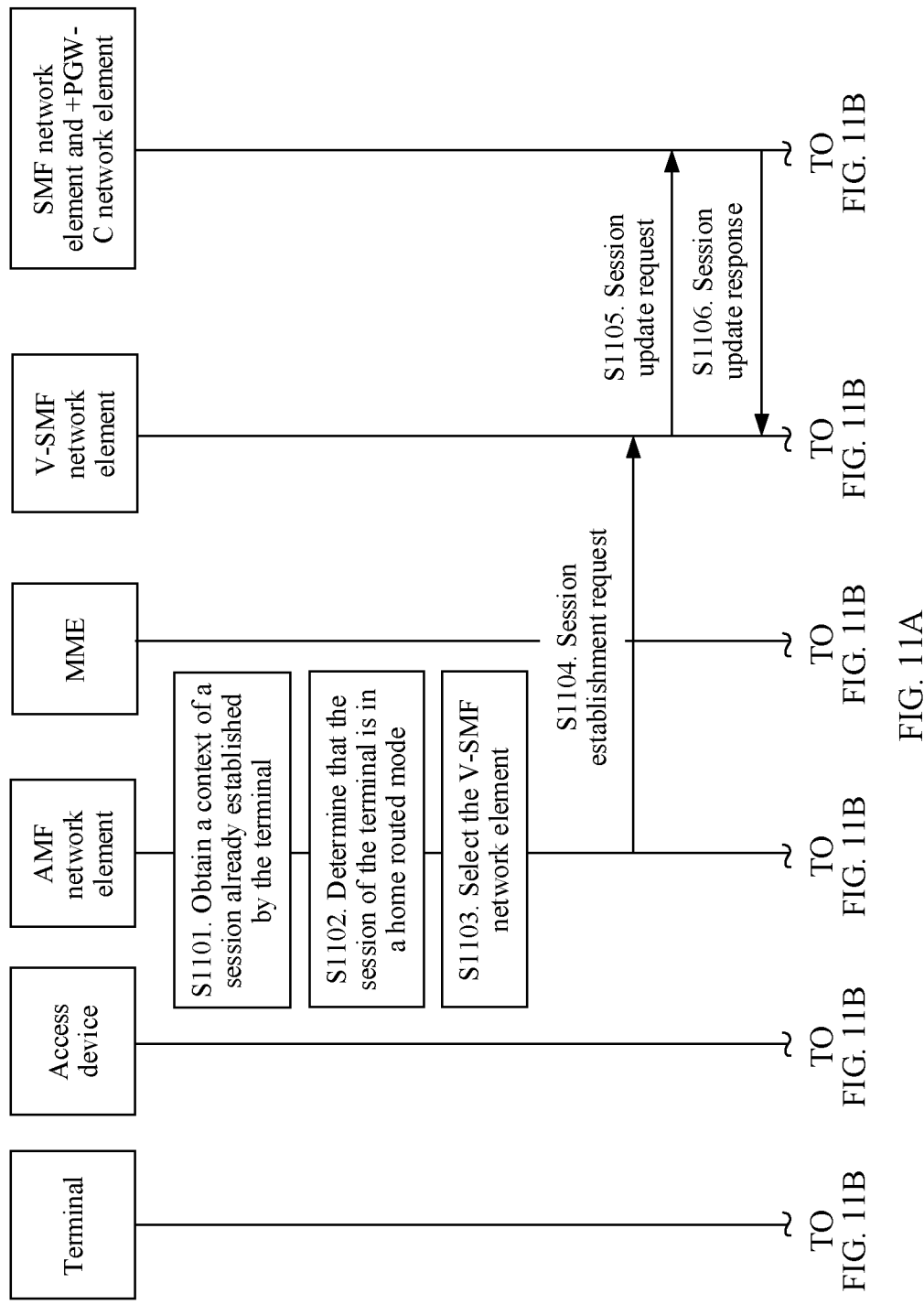
FIG. 11A and FIG. 11B are a fifth schematic flowchart of a handover method according to an embodiment of this application.
Figure 11B:
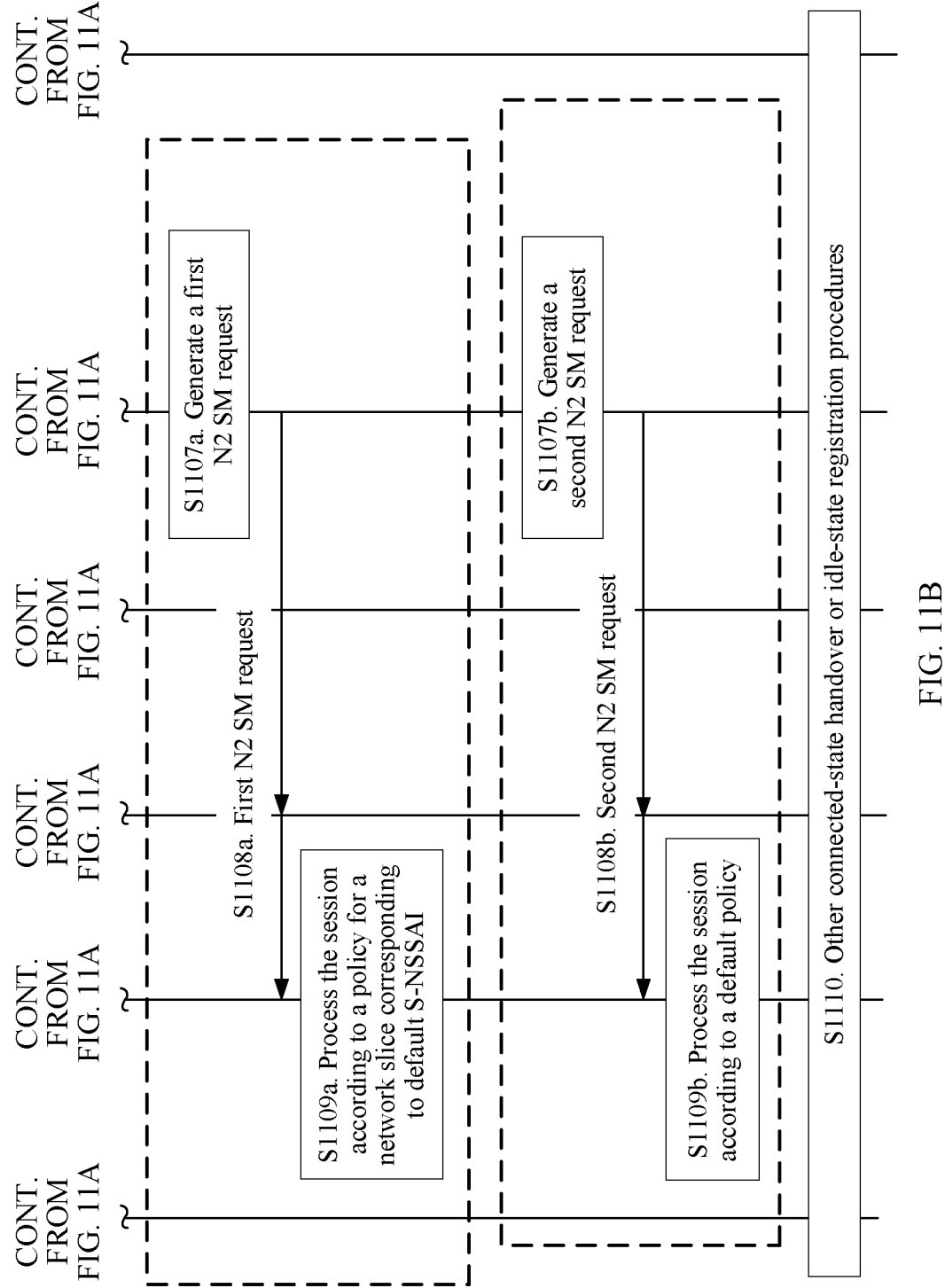

An example in which the handover system shown in FIG. 2 is applied to the architecture of interworking between the 4G network and the 5G network shown in FIG. 1 is used. FIG. 11A and FIG. 11B show another handover method according to an embodiment of this application. The handover method is applied to a connected-state handover procedure of a terminal or an idle-state registration procedure of the terminal, and includes the following steps:

S1101. An AMF network element obtains a context of a session already established by the terminal.

In a possible implementation, in the idle-state registration procedure of the terminal, after receiving a registration request from the terminal, the AMF network element may obtain a session context of the terminal from an MME, where the session context of the terminal includes the context of the session already established by the terminal.

In another possible implementation, in the connected-state handover procedure of the terminal, the AMF network element may receive a handover request from an MME, where the handover request may carry a session context of the terminal, and the session context of the terminal includes the context of the session already established by the terminal.

Optionally, in this embodiment of this application, the context of the session includes information about an SMF network element+PGW-C network element corresponding to the session, for example, an address and identifier of the SMF network element+PGW-C network element. This is not specifically limited in this embodiment of this application. Certainly, the context of the session may further include other information, such as a default bearer identifier of the session. For related descriptions, refer to an existing implementation. Details are not described herein.

S1102. The AMF network element determines that the session of the terminal is in a home routed mode.

For a manner in which the AMF network element determines that the session of the terminal is in the home routed mode, refer to step S707 in the embodiment shown in FIG. 7A and FIG. 7B. Details are not described herein again.

S1103. The AMF network element selects a V-SMF network element.

For related implementation of step S1103, refer to an existing implementation. Details are not described herein.

S1104. The AMF network element sends a session establishment request to the V-SMF network element, so that the V-SMF network element receives the session establishment request from the AMF network element.

The session establishment request carries default S-NSSAI or indication information. The indication information is used to indicate that S-NSSAI corresponding to the session has not been obtained. For related descriptions of the default S-NSSAI, refer to the handover system part shown in FIG. 2. Details are not described herein again.

Optionally, the AMF maps default S-NSSAI to which the terminal subscribes as the default S-NSSAI, or the AMF determines, based on a configuration, that S-NSSAI at a visited location is the default S-NSSAI.

S1105. The V-SMF network element sends a session update request to the SMF network element+PGW-C network element, so that the SMF network element+PGW-C network element receives the session update request.

S1106. The SMF network element+PGW-C network element sends a session update response to the V-SMF network element, so that the V-SMF network element receives the session update response from the SMF network element+PGW-C network element.

For a specific implementation of step S1105 and step S1106, refer to an existing implementation. Details are not described herein.

Optionally, the handover method provided in this embodiment of this application may further include the following step S1107a to step S1109a.

S1107a. The V-SMF network element generates a first N2 SM message based on the session establishment request.

The first N2 SM request carries the default S-NSSAI corresponding to the session, and is used to indicate to an access device to process the session according to a policy for a network slice corresponding to the default S-NSSAI.

S1108a and S1109a. The steps are the same as S704a and step S705a. For related descriptions, refer to the embodiment shown in FIG. 7A and FIG. 7B. Details are not described herein again.

Alternatively, optionally, the handover method provided in this embodiment of this application may further include the following step S1107b to step S1109b.

S1107b. The V-SMF network element generates a second N2 SM message based on the session establishment request.

The second N2 SM request does not carry S-NSSAI or carries first indication information, and is used to indicate to the access device to process the session according to a default policy.

For related descriptions of the first indication information, refer to the handover system shown in FIG. 2. Details are not described herein again.

S1108b and S1109b. The steps are the same as S704b and step S705b. For related descriptions, refer to the embodiment shown in FIG. 7A and FIG. 7B. Details are not described herein again.

S1110. Other steps in the connected-state handover or idle-state registration procedure.

If the handover method is applied to the connected-state handover procedure of the terminal, optionally, in this embodiment of this application, after the connected-state handover procedure of the terminal ends, an existing connected-state registration procedure may be performed. Alternatively, after the connected-state handover procedure of the terminal ends, the connected-state registration procedure shown in FIG. 7A and FIG. 7B may be performed. This is not specifically limited in this embodiment of this application.

If the handover method is applied to the idle-state registration procedure of the terminal, optionally, in this embodiment of this application, after the idle-state registration procedure of the terminal ends, if the AMF network element may obtain the first S-NSSAI corresponding to the session, the AMF network element may alternatively send the first S-NSSAI to the access device through the V-SMF network element with reference to the manner in the connected-state registration procedure in the embodiment shown in FIG. 7A and FIG. 7B, so that the access device can update the network slice corresponding to the session. For related descriptions, refer to the connected-state registration procedure in the embodiment shown in FIG. 7A and FIG. 7B. The AMF may send the first S-NSSAI to the V-SMF in a session modification procedure, a service request procedure, or a subsequent registration procedure of the terminal; or may send a notification message with the first S-NSSAI to the V-SMF after the idle-state registration procedure ends. Details are not described herein again.

In addition, step S1101 to step S1109a or step S1101 to step S1109b are merely some steps of the connected-state handover procedure or the idle-state registration procedure of the terminal, and another step may be further included in the connected-state handoverhandover procedure of the terminal or the idle-state registration procedure of the terminal. For details, refer to an existing implementation. Details are not described herein.

Based on this solution, when the terminal is handed over from the 4G network to the 5G network, a problem of a session handover failure caused because the V-SMF network element cannot obtain the S-NSSAI that is of the visited network of the terminal and that is corresponding to the session of the terminal, and sends second S-NSSAI corresponding to the session of the terminal to the access device can be avoided, so that the access device can process the session according to the policy for the network slice corresponding to the default S-NSSAI. For analysis of a related technical effect, refer to the handover system part shown in FIG. 2. Details are not described herein again.

The actions of the AMF network element or the V-SMF network element in step S1101 to step S1110 may be performed by the processor 601 in the communications device 600 shown in FIG. 6 by invoking the application program code stored in the memory 603. This is not limited in this embodiment.

Figure 12:
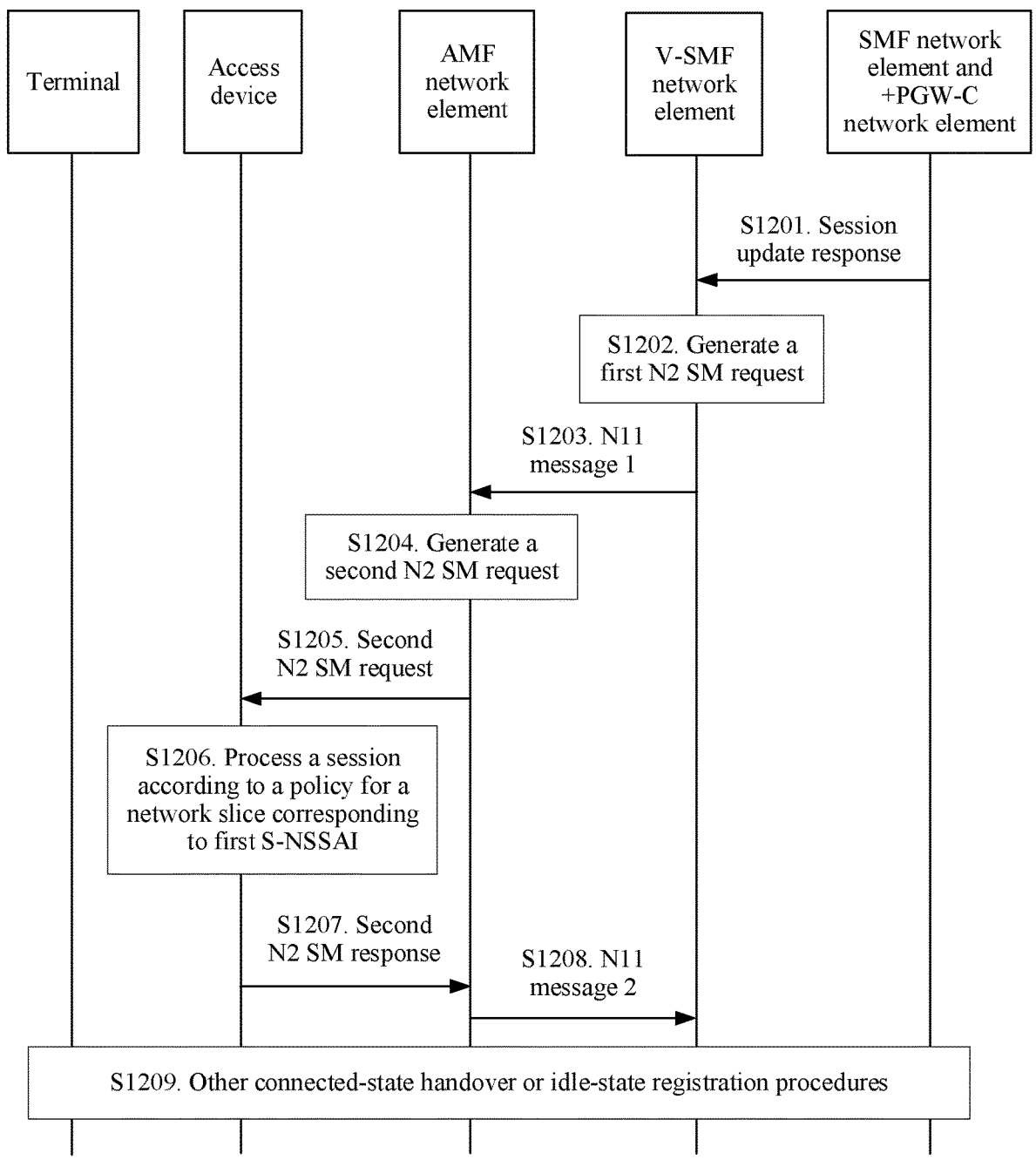
FIG. 12 is a sixth schematic flowchart of a handover method according to an embodiment of this application.

An example in which the handover system shown in FIG. 2 is applied to the architecture of interworking between the 4G network and the 5G network shown in FIG. 1 is used. FIG. 12 shows another handover method according to an embodiment of this application. The handover method is applied to a connected-state handover procedure of a terminal or an idle-state registration procedure of a terminal, and includes the following steps:

S1201. An SMF network element+PGW-C network element sends a session update response to a V-SMF network element, so that the V-SMF network element receives the session update response from the SMF network element+PGW-C network element.

The session update response carries second S-NSSAI.

Optionally, in this embodiment of this application, the session update response may further carry indication information of a home network of the terminal. For example, the indication information of the home network of the terminal may include an identifier of the home network of the terminal or other information that can indicate the home network of the terminal. This is not specifically limited in this embodiment of this application.

Optionally, in this embodiment of this application, for a manner in which the V-SMF network element determines that the second S-NSSAI is not S-NSSAI of a visited network of the terminal or is S-NSSAI of the home network of the terminal, refer to the descriptions of step S702.

Details are not described herein again.

S1202. The V-SMF network element generates a first N2 SM request based on the session update response.

The first N2 SM request does not carry S-NSSAI, or carries any S-NSSAI. This is not specifically limited in this embodiment of this application.

S1203. The V-SMF network element sends an N11 message 1 to an AMF network element, so that the AMF network element receives the N11 message 1 from the V-SMF network element.

The N11 message 1 carries the first N2 SM request and the second S-NSSAI.

Optionally, if the session update response in step S1201 may carry the indication information of the home network of the terminal, the N11 message may further carry the indication information of the home network of the terminal. This is not specifically limited in this application.

S1204. If the session is in a home routed mode, the AMF network element obtains, based on the second S-NSSAI and the indication information of the home network of the terminal, first S-NSSAI corresponding to the session of the terminal.

For a manner in which the AMF network element obtains, based on the second S-NSSAI and the indication information of the home network of the terminal, the first S-NSSAI corresponding to the session of the terminal, refer to related descriptions of step S707. Details are not described herein again.

S1205. The AMF network element generates a second N2 SM request based on the first N2 SM request, where the second N2 SM request carries the first S-NSSAI.

In a possible implementation, if the first N2 SM request does not carry S-NSSAI, the AMF network element may write the first S-NSSAI into the first N2 SM request, to obtain the second N2 SM request.

In another possible implementation, if the first N2 SM request carries any S-NSSAI, the AMF network element may replace the any S-NSSAI in the first S-NSSAI with the first S-NSSAI, to obtain the second N2 SM request.

S1206. The AMF network element sends the second N2 SM request to an access device of the terminal, so that the access device receives the second N2 SM request from the AMF network element.

S1207. The access device sends a second N2 SM response to the AMF network element, so that the AMF network element receives the second N2 SM response from the access device.

S1208. The AMF network element sends an N11 message 2 to the V-SMF network element, so that the V-SMF network element receives the N11 message 2 from the AMF network element.

The N11 message 2 carries the second N2 SM response and the first S-NS SAT, so that the V-SMF network element stores the first S-NSSAI.

S1209. Another connected-state handover or idle-state registration procedure.

Step S1201 to step S1208 are merely some steps of the connected-state handover procedure or the idle-state registration procedure of the terminal, and another step may be further included in the connected-state handover procedure of the terminal or the idle-state registration procedure of the terminal. For details, refer to an existing implementation. Details are not described herein.

Based on this solution, the AMF network element can obtain the first S-NSSAI corresponding to the session of the terminal, and can send the first S-NSSAI to the access device, so that the access device can obtain the first S-NSSAI. Therefore, a problem of a session handover failure caused because the V-SMF network element cannot obtain the S-NSSAI that is of the visited network of the terminal and that is corresponding to the session of the terminal, and sends the second S-NSSAI corresponding to the session of the terminal to the access device can be avoided, so that the access device can process the session according to a policy for a network slice corresponding to the first S-NS SAL The actions of the AMF network element or the V-SMF network element in step S1201 to step S1209 may be performed by the processor 601 in the communications device 600 shown in FIG. 6 by invoking the application program code stored in the memory 603. This is not limited in this embodiment.

The foregoing mainly describes the solutions provided in the embodiments of this application from a perspective of interaction between the network elements. It may be understood that, to implement the foregoing functions, the visited session management network element and the mobility management network element include corresponding hardware structures and/or software modules corresponding to the functions. A person skilled in the art should be easily aware that units and algorithm steps in the examples described with reference to the embodiments disclosed in this specification may be implemented in a form of hardware or in a form of a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules of the visited session management network element or the mobility management network element may be divided according to the foregoing method examples. For example, the functional modules may be divided corresponding to the functions, or two or more functions may be integrated into one processing module. The integrated module may be implemented in a form of hardware, or may be implemented in a form of a software functional module. It should be noted that the module division in the embodiments of this application is an example, and is merely logical function division. There may be another division manner in an actual implementation.

Figure 13:
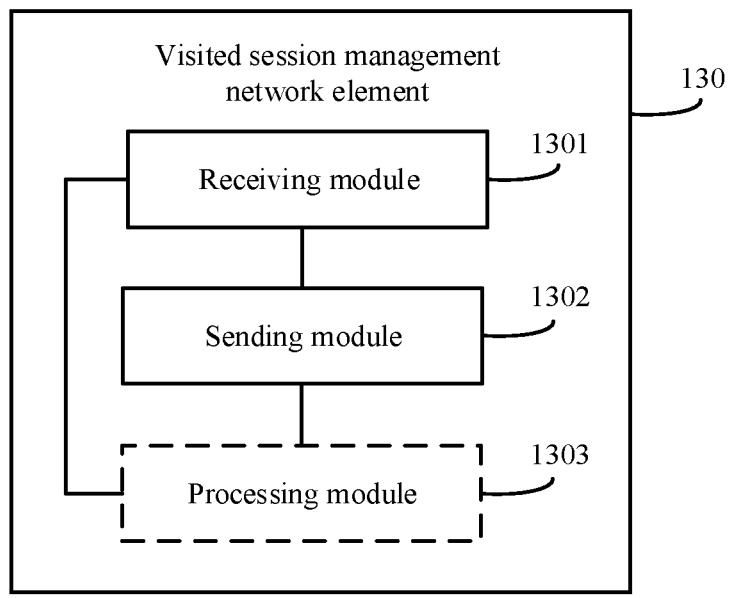
FIG. 13 is a first schematic structural diagram of a visited session management network element according to an embodiment of this application.

For example, if the functional modules are divided through integration, FIG. 13 is a schematic structural diagram of a visited session management network element 130. The visited session management network element 130 includes a receiving module 1301 and a sending module 1302. The receiving module 1301 is configured to: in a connected-state registration procedure of a terminal, receive a session update request from a mobility management network element serving the terminal, where the session update request carries first S-NSSAI corresponding to a session of the terminal, the first S-NSSAI is obtained by mapping second S-NSSAI corresponding to the session of the terminal, the first S-NSSAI is S-NSSAI of a visited network of the terminal, and the second S-NSSAI is S-NSSAI of a home network of the terminal. The sending module 1302 is configured to send the first S-NSSAI to an access device of the terminal, where the first S-NSSAI is used to update a network slice corresponding to the session.

Optionally, the sending module 1302 is further configured to: in a connected-state handover procedure of the terminal, send a first N2 SM request or a second N2 SM request to the access device, where the first N2 SM request carries default S-NSSAI corresponding to the session of the terminal, and is used to indicate to the access device to process the session according to a policy for a network slice corresponding to the default S-NSSAI; the second N2 SM request does not carry S-NSSAI or carries first indication information, and is used to indicate to the access device to process the session according to a default policy; and the default S-NSSAI is the S-NSSAI of the visited network of the terminal.

Optionally, as shown in FIG. 13, the visited session management network element 130 may further include a processing module 1303. The receiving module 1301 is further configured to receive a session update response from an anchor session management network element corresponding to the session, where the session update response carries the first indication information or the second S-NSSAI, or the session update response does not carry S-NSSAI. The processing module 1303 is configured to generate the first N2 SM request or the second N2 SM request based on the session update response.

Optionally, that the sending module 1302 is configured to send the first S-NSSAI to the access device of the terminal includes: determining that the first S-NSSAI in the session update request is different from the second S-NSSAI carried in the session update response; or determining, by the visited session management network element, that the session update response does not carry S-NSSAI or the session update response carries the first indication information; and sending the first S-NSSAI to the access device.

Alternatively, optionally, as shown in FIG. 13, the visited session management network element 130 may further include a processing module 1303. The receiving module 1301 is further configured to receive a session establishment request from the mobility management network element, where the session establishment request carries the first indication information or the default S-NSSAI; and the processing module 1303 is configured to generate the first N2 SM request or the second N2 SM request based on the session establishment request.

Alternatively, optionally, as shown in FIG. 13, the visited session management network element 130 may further include a processing module 1303. The processing module 1303 is configured to determine that the second S-NSSAI is the S-NSSAI of the home network of the terminal.

Optionally, that the processing module 1303 is configured to determine that the second S-NSSAI is the S-NSSAI of the home network of the terminal includes: determining, based on information about the anchor session management network element, that the session is in a home routed mode; and determining that the second S-NSSAI is the S-NSSAI of the home network of the terminal.

Alternatively, optionally, the session update response further carries indication information of the home network; and correspondingly, that the processing module 1303 is configured to determine that the second S-NSSAI is the S-NSSAI of the home network of the terminal includes: determining, based on the indication information of the home network, that the second S-NSSAI is the S-NSSAI of the home network of the terminal.

All related content of steps in the foregoing method embodiments may be cited in function descriptions of corresponding functional modules. Details are not described herein again.

In this embodiment, the visited session management network element 130 is presented with the functional modules divided through integration. The "module" herein may be a specific ASIC, a circuit, a processor executing one or more software or firmware programs, a memory, an integrated logic circuit, and/or another device that can provide the foregoing function. In a simple embodiment, a person skilled in the art may figure out that the visited session management network element 130 may be in the form shown in FIG. 6.

For example, the processor 601 in FIG. 6 may invoke the computer executable instruction stored in the memory 603, so that the visited session management network element 130 performs the handover methods in the foregoing method embodiments.

Specifically, the functions/implementation processes of the receiving module 1301, the sending module 1302, and the processing module 1303 in FIG. 13 may be implemented by the processor 601 in FIG. 6 by invoking the computer executable instruction stored in the memory 603. Alternatively, the functions/implementation processes of the receiving module 1301 and the sending module 1302 in FIG. 13 may be implemented by the communications interface 604 in FIG. 6, and the functions/implementation processes of the processing module 1303 in FIG. 13 may be implemented by the processor 601 in FIG. 6 by invoking the computer executable instruction stored in the memory 603.

The visited session management network element 130 provided in this embodiment can perform the foregoing handover methods. Therefore, for a technical effect that can be achieved by the visited session management network element 130, refer to the foregoing method embodiments. Details are not described herein again.

Optionally, an embodiment of this application further provides a chip system. The chip system includes a processor, configured to support the visited session management network element 130 in implementing the handover methods, for example, generating a first N2 SM request or a second N2 SM request based on a session update response. In a possible design, the chip system further includes a memory. The memory is configured to store a program instruction and data that are necessary for the visited session management network element 130. Certainly, the memory may alternatively be not in the chip system. The chip system may include a chip, or may include a chip and another discrete device. This is not specifically limited in this embodiment of this application.

Figure 14:
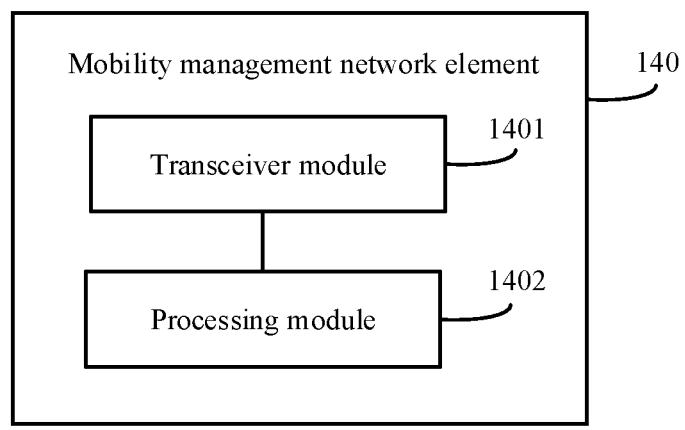
FIG. 14 is a schematic structural diagram of a mobility management network element according to an embodiment of this application.

For example, if the functional modules are divided through integration, FIG. 14 is a schematic structural diagram of a mobility management network element 140. The mobility management network element 140 includes a processing module 1401 and a transceiver module 1402. The processing module 1401 is configured to obtain second S-NSSAI corresponding to a session of a terminal and indication information of a home network of the terminal, where the second S-NSSAI is S-NSSAI of the home network of the terminal. The processing module 1401 is further configured to obtain, based on the second S-NSSAI and the indication information of the home network, first S-NSSAI corresponding to the session of the terminal, where the first S-NSSAI is S-NSSAI of a visited network of the terminal. The transceiver module 1402 is configured to send the first S-NSSAI to a visited session management network element serving the terminal, where the first S-NSSAI is used to indicate a network slice corresponding to the session.

Optionally, that the processing module 1401 is configured to obtain, based on the second S-NSSAI and the indication information of the home network, first S-NSSAI corresponding to the session of the terminal includes: determining, based on the second S-NSSAI, the indication information of the home network, and a locally configured correspondence between the second S-NSSAI and the first S-NSSAI, the first S-NSSAI corresponding to the session of the terminal.

Alternatively, optionally, that the processing module 1401 is configured to obtain, based on the second S-NSSAI and the indication information of the home network, first S-NSSAI corresponding to the session of the terminal includes: sending a first message to a slice selection function network element, where the first message carries the second S-NSSAI and the indication information of the home network, and is used to request the first S-NSSAI; and receiving, from the slice selection function network element, the first S-NSSAI corresponding to the session of the terminal.

Optionally, that the processing module 1401 is configured to obtain second S-NSSAI corresponding to a session of a terminal and indication information of a home network of the terminal includes: receiving a registration request from the terminal, where the registration request carries the second S-NSSAI, the indication information of the home network, and a session identifier of the session, and the session identifier is used by the processing module 1401 to associate the first S-NSSAI with the session.

Optionally, that the processing module 1401 is configured to obtain second S-NSSAI corresponding to a session of a terminal and indication information of a home network of the terminal includes: receiving a second message from the visited session management network element, where the second message carries the second S-NSSAI and the indication information of the home network.

Optionally, the transceiver module 1402 is further configured to send the first S-NSSAI and the second S-NSSAI to the terminal, so that the terminal associates the first S-NSSAI with the session of the terminal.

Alternatively, optionally, the transceiver module 1402 is further configured to send the first S-NSSAI and the session identifier of the session to the terminal, so that the terminal associates the first S-NSSAI with the session of the terminal.

Optionally, the transceiver module 1402 is further configured to send a session establishment request to the visited session management network element, where the session establishment request carries first indication information or default S-NS SAT, and the default S-NSSAI is the S-NSSAI of the visited network of the terminal; and the first indication information or the second S-NSSAI is used to indicate to the visited session management network element to generate a first N2 SM request, and the first N2 SM request carries the default S-NSSAI corresponding to the session of the terminal, and is used to indicate to an access device of the terminal to process the session according to a policy for a network slice corresponding to the default S-NSSAI; or the first indication information or the second S-NSSAI is used to indicate to the visited session management network element to generate a second N2 SM request, and the second N2 SM request does not carry S-NSSAI or carries the first indication information, and is used to indicate to an access device of the terminal to process the session according to a default policy.

All related content of steps in the foregoing method embodiments may be cited in function descriptions of corresponding functional modules. Details are not described herein again.

In this embodiment, the mobility management network element 140 is presented with the functional modules divided through integration. The "module" herein may be a specific ASIC, a circuit, a processor executing one or more software or firmware programs, a memory, an integrated logic circuit, and/or another device that can provide the foregoing function. In a simple embodiment, a person skilled in the art may figure out that the mobility management network element 140 may be in the form shown in FIG. 6.

For example, the processor 601 in FIG. 6 may invoke the computer executable instruction stored in the memory 603, so that the mobility management network element 140 performs the handover methods in the foregoing method embodiments.

Specifically, the functions/implementation processes of the processing module 1401 and the transceiver module 1402 in FIG. 14 may be implemented by the processor 601 in FIG. 6 by invoking the computer executable instruction stored in the memory 603. Alternatively, the functions/implementation processes of the transceiver module 1402 in FIG. 14 may be implemented by the communications interface 604 in FIG. 6, and the functions/implementation processes of the processing module 1401 in FIG. 14 may be implemented by the processor 601 in FIG. 6 by invoking the computer executable instruction stored in the memory 603.

The mobility management network element 140 provided in this embodiment can perform the foregoing handover methods. Therefore, for a technical effect that can be achieved by the mobility management network element 140, refer to the foregoing method embodiments. Details are not described herein again.

Optionally, an embodiment of this application further provides a chip system. The chip system includes a processor, configured to support the mobility management network element 140 in implementing the handover methods, for example, obtaining second S-NSSAI corresponding to a session of a terminal and indication information of a home network of the terminal. In a possible design, the chip system further includes a memory. The memory is configured to store a program instruction and data that are necessary for the mobility management network element 140. Certainly, the memory may alternatively be not in the chip system. The chip system may include a chip, or may include a chip and another discrete device. This is not specifically limited in this embodiment of this application.

Figure 15:
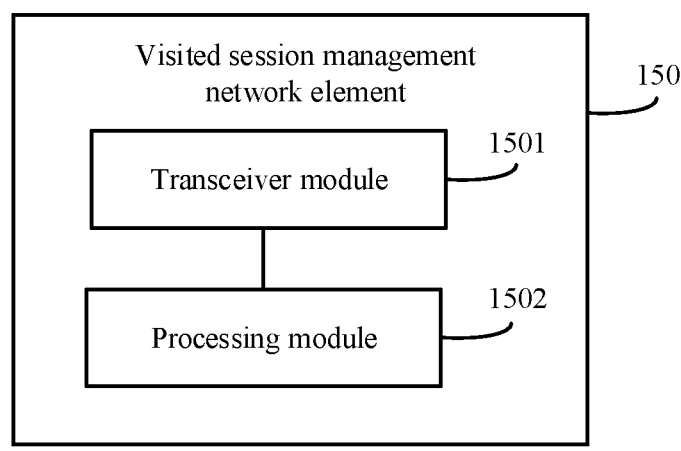
FIG. 15 is a second schematic structural diagram of a visited session management network element according to an embodiment of this application.

For example, if the functional modules are divided through integration, FIG. 15 is a schematic structural diagram of a visited session management network element 150. The visited session management network element 150 includes a processing module 1501 and a transceiver module 1502. The transceiver module 1502 is configured to: in a connected-state handover procedure of a terminal or an idle-state registration procedure of a terminal, receive, from a mobility management network element serving the terminal, default S-NSSAI corresponding to a session of the terminal or first indication information, where the default S-NSSAI is S-NSSAI of a visited network of the terminal. The processing module 1501 is configured to generate a first N2 SM request based on the default S-NSSAI or the first indication information, where the first N2 SM request carries the default S-NSSAI, and is used to indicate to an access device of the terminal to process the session according to a policy for a network slice corresponding to the default S-NSSAI; the processing module 1501 is configured to generate a second N2 SM request based on the default S-NSSAI or the first indication information, where the second N2 SM request does not carry S-NSSAI or carries the first indication information, and is used to indicate to an access device of the terminal to process the session according to a default policy. The transceiver module 1502 is further configured to send the first N2 SM request or the second N2 SM request to the access device of the terminal.

Optionally, the transceiver module 1502 is further configured to receive, from the mobility management network element, first S-NSSAI corresponding to the session of the terminal, where the first S-NSSAI is obtained by mapping second S-NSSAI corresponding to the session of the terminal, the first S-NSSAI is the S-NSSAI of the visited network of the terminal, and the second S-NSSAI is S-NSSAI of a home network of the terminal. The transceiver module 1502 is further configured to send the first S-NSSAI to the access device of the terminal, where the first S-NSSAI is used to update a network slice corresponding to the session of the terminal.

All related content of steps in the foregoing method embodiments may be cited in function descriptions of corresponding functional modules. Details are not described herein again.

In this embodiment, the visited session management network element 150 is presented with the functional modules divided through integration. The "module" herein may be a specific ASIC, a circuit, a processor executing one or more software or firmware programs, a memory, an integrated logic circuit, and/or another device that can provide the foregoing function. In a simple embodiment, a person skilled in the art may figure out that the visited session management network element 150 may be in the form shown in FIG. 6.

For example, the processor 601 in FIG. 6 may invoke the computer executable instruction stored in the memory 603, so that the visited session management network element 150 performs the handover methods in the foregoing method embodiments.

Specifically, the functions/implementation processes of the processing module 1501 and the transceiver module 1502 in FIG. 15 may be implemented by the processor 601 in FIG. 6 by invoking the computer executable instruction stored in the memory 603. Alternatively, the functions/implementation processes of the transceiver module 1502 in FIG. 15 may be implemented by the communications interface 604 in FIG. 6, and the functions/implementation processes of the processing module 1501 in FIG. 15 may be implemented by the processor 601 in FIG. 6 by invoking the computer executable instruction stored in the memory 603.

The visited session management network element 150 provided in this embodiment can perform the foregoing handover methods. Therefore, for a technical effect that can be achieved by the visited session management network element 150, refer to the foregoing method embodiments. Details are not described herein again.

Optionally, an embodiment of this application further provides a chip system. The chip system includes a processor, configured to support the visited session management network element 150 in implementing the handover methods, for example, generating a first N2 SM request or a second N2 SM request based on default S-NSSAI or first indication information. In a possible design, the chip system further includes a memory. The memory is configured to store a program instruction and data that are necessary for the visited session management network element 150. Certainly, the memory may alternatively be not in the chip system. The chip system may include a chip, or may include a chip and another discrete device. This is not specifically limited in this embodiment of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, the word "comprising" does not exclude another component or step, and "a" or "one" does not exclude a case of plurality. A single processor or another unit may implement several functions enumerated in the claims. Some measures are described in dependent claims that are different from each other, but this does not mean that these measures cannot be combined to produce a better effect.

Although this application is described with reference to specific features and the embodiments thereof, apparently, various modifications and combinations may be made to them without departing from the spirit and scope of this application. Correspondingly, this specification and the accompanying drawings are merely examples of descriptions of this application defined by the appended claims, and are considered as any or all of modifications, variations, combinations or equivalents that cover the scope of this application. Obviously, a person skilled in the art can make various modifications and variations to this application without departing from the spirit and scope of this application. In this way, this application is intended to cover these modifications and variations of this application provided that they fall within the scope of the claims of this application and equivalent technologies thereof

What is claimed is:

1. A method performed by an access and mobility management function network element in a visited network in a home-routed roaming operation in which a terminal accesses the visited network, comprising:
    obtaining single network slice selection assistance information (S-NSSAI) for a home network corresponding to a session of the terminal, wherein the access and mobility management function network element receives the S-NSSAI for the home network from a visited session management network element in the visited network;
    obtaining S-NSSAI for the visited network corresponding to the session of the terminal, based on a mapping relationship between the S-NSSAI for the home network and the S-NSSAI for the visited network; and
    sending, the S-NSSAI for the visited network to an access device of the terminal in the visited network.

2. The method according to claim 1, wherein the step of obtaining the S-NSSAI for the visited network comprises:
    obtaining the S-NSSAI for the visited network based on the S-NSSAI for the home network and indication information of the home network.

3. The method according to claim 2, wherein the step of obtaining the S-NSSAI for the visited network comprises:
    sending a message to a slice selection function network element, wherein the message comprises the S-NSSAI for the home network and the indication information of the home network; and
    receiving, from the slice selection function network element, the S-NSSAI for the visited network.

4. The method according to claim 1, further comprising:
    before sending the S-NSSAI for the visited network to the access network, sending a default S-NSSAI for the visited network to the access network.

5. The method according to claim 4, wherein the step of sending the default S-NSSAI comprises:
    sending the default S-NSSAI for the visited network to the access network though the visited session management network element in the visited network.

6. The method according to claim 1, wherein the step of sending the S-NSSAI for the visited network comprises:
sending the S-NSSAI for the visited network to the access device though the visited session management network element in the visited network.

7. An apparatus, comprising:
a processor; and
a memory storing executable instructions;
wherein the processor is configured to execute the executable instructions to perform operations of:
in a home-routed roaming operation in which a terminal accesses a visited network that comprises the apparatus, obtaining single network slice selection assistance information (S-NSSAI) for a home network corresponding to a session of the terminal, wherein the apparatus receives the S-NSSAI for the home network from a visited session management network element in the visited network;
obtaining S-NSSAI for the visited network corresponding to the session of the terminal, based on a mapping relationship between the S-NSSAI for the home network and the S-NSSAI for the visited network; and
sending the S-NSSAI for the visited network to an access device of the terminal in the visited network.

8. The apparatus according to claim 7, wherein the operation of obtaining the S-NSSAI for the visited network comprises:
obtaining the S-NSSAI for the visited network based on the S-NSSAI for the home network and indication information of the home network.

9. The apparatus according to claim 8, wherein the operation of obtaining the S-NSSAI for the visited network comprises:
sending a message to a slice selection function network element, wherein the message comprises the S-NSSAI for the home network and the indication information of the home network; and
receiving the S-NSSAI for the visited network from the slice selection function network element.

10. The apparatus according to claim 7, wherein before sending the S-NSSAI for the visited network, the processor is further configured to perform an operation of:
sending a default S-NSSAI for the visited network to the access network.

11. The apparatus according to claim 10, wherein the operation of sending the default S-NSSAI comprises:
sending the default S-NSSAI for the visited network to the access network though the visited session management network element in the visited network.

12. The apparatus according to claim 7, wherein the operation of sending the S-NSSAI for the visited network comprises:
sending the S-NSSAI for the visited network to the access device though the visited session management network element in the visited network.

13. A system for carrying out a home-routed roaming operation, comprising:
an access and mobility management function network element in a visited network accessed by a terminal in the home-routed roaming operation; and
an access device in the visited network for handling access of the terminal to the visited network;
wherein the access and mobility management function network element is configured to:
obtain single network slice selection assistance information (S-NSSAI) for a home network corresponding to a session of the terminal, wherein the access and mobility management function network element receives the S-NSSAI for the home network from a visited session management network element in the visited network;
obtain S-NSSAI for the visited network corresponding to the session of the terminal, based on a mapping relationship between the S-NSSAI for the home network and the 5-NSSAI for the visited network; and
send the S-NSSAI for the visited network to the access device in the visited network;
wherein the access device is configured to:
receive the S-NSSAI for the visited network from the access and mobility management function network element; and
process the session of the terminal according to a policy for a network slice corresponding to the S-NSSAI for the visited network.

14. The system according to claim 13,
wherein the access and mobility management function network element is further configured to send a default S-NSSAI for the visited network to the access network; and
wherein the access network is further configured to receive the default S-NSSAI for the visited network from the access and mobility management function network element.

* * * * *

UNITED STATES PATENT AND TRADEMARK OFFICE
CERTIFICATE OF CORRECTION

PATENT NO. : 11,985,589 B2
APPLICATION NO. : 16/951489
DATED : May 14, 2024
INVENTOR(S) : Zong et al.

Page 1 of 1

It is certified that error appears in the above-identified patent and that said Letters Patent is hereby corrected as shown below:

On the Title Page

Page 2: item (56) References Cited, Other Publications, Right-Hand Column, Line 4, NPL Citation #5: "SMF E2E" should read --SMF–E2E--

Page 2: item (56) References Cited, Other Publications, Right-Hand Column, Line 11, NPL Citation #7: "total 7 pages" should read --total 2 pages--

Page 2: item (56) References Cited, Other Publications, Right-Hand Column, Line 27, NPL Citation #11: "ServicesStage" should read --Services Stage--

Page 2: item (56) References Cited, Other Publications, Right-Hand Column, Line 31, NPL Citation #12: "ServicesStage" should read --Services Stage--

Signed and Sealed this
Fifteenth Day of April, 2025

Coke Morgan Stewart
*Acting Director of the United States Patent and Trademark Office*